United States Patent
Arms et al.

(10) Patent No.: US 7,256,505 B2
(45) Date of Patent: Aug. 14, 2007

(54) SHAFT MOUNTED ENERGY HARVESTING FOR WIRELESS SENSOR OPERATION AND DATA TRANSMISSION

(75) Inventors: Steven W. Arms, Williston, VT (US); Christopher P Townsend, Shelburne, VT (US); David L. Churchill, Burlington, VT (US); Michael J. Hamel, Essex Junction, VT (US)

(73) Assignee: MicroStrain, Inc., Williston, VT (US)

( * ) Notice: Subject to any disclaimer, the term of this patent is extended or adjusted under 35 U.S.C. 154(b) by 0 days.

(21) Appl. No.: 10/769,642

(22) Filed: Jan. 31, 2004

(65) Prior Publication Data

US 2005/0017602 A1   Jan. 27, 2005

Related U.S. Application Data

(63) Continuation-in-part of application No. 10/379,223, filed on Mar. 5, 2003.

(51) Int. Cl.
*G01L 3/10*   (2006.01)
(52) U.S. Cl. ..................................... 290/1 R
(58) Field of Classification Search ................ 290/1 R
See application file for complete search history.

(56) References Cited

U.S. PATENT DOCUMENTS

| | | | | |
|---|---|---|---|---|
| 3,551,794 A | * | 12/1970 | Vander Heyden et al. | .. 324/306 |
| 4,072,926 A | * | 2/1978 | Shimahara et al. | ......... 340/448 |
| 4,237,454 A | * | 12/1980 | Meyer | ........................ 340/682 |
| 4,309,628 A | * | 1/1982 | Wiegand | .................... 307/419 |
| 4,523,482 A | * | 6/1985 | Barkhoudarian | ....... 73/862.336 |
| 4,631,921 A | | 12/1986 | Linderfelt | |
| 4,712,433 A | * | 12/1987 | Hochstein et al. | ..... 73/862.334 |
| 5,010,568 A | * | 4/1991 | Merriam et al. | ....... 379/106.07 |

(Continued)

FOREIGN PATENT DOCUMENTS

DE        3133061 A1 *  4/1982

(Continued)

OTHER PUBLICATIONS

Talneau et al., Development of an electromagnetic microgenerator, Sep. 8, 1997, Electronic Letters on Line No. 19971301.*

(Continued)

*Primary Examiner*—Joseph Waks
(74) *Attorney, Agent, or Firm*—James Marc Leas

(57) ABSTRACT

A device for monitoring a rotating shaft is provided. The device measures strain in the shaft and provides angular velocity and torque in the shaft. The device includes a sensor, sensor conditioning circuitry, a microprocessor, and a transmitter, all located on a rotating shaft. The device obtains power by harvesting mechanical energy of the rotating shaft itself. Coils are provided rotating with the shaft and permanent magnets are mounted adjacent the rotating shaft so electrical energy is induced in the coils as they rotate through the magnetic field of the permanent magnets. A battery or capacitor is connected to the coils for storing energy. A microprocessor is connected to the sensors, the storage device, and the transmitter for managing power consumption and for monitoring the amount of electrical energy stored in the storage device and for switchably connecting the storage device to the transmitter when the stored energy exceeds a threshold.

110 Claims, 22 Drawing Sheets

U.S. PATENT DOCUMENTS

| | | | | |
|---|---|---|---|---|
| 5,161,182 | A | * | 11/1992 | Merriam et al. ....... 379/106.07 |
| 5,459,360 | A | | 10/1995 | Varo |
| 5,591,925 | A | * | 1/1997 | Garshelis ................ 73/862.335 |
| 5,736,938 | A | * | 4/1998 | Ruthroff ................ 340/870.37 |
| 5,801,644 | A | * | 9/1998 | Ruthroff ................ 340/870.31 |
| 5,952,762 | A | * | 9/1999 | Larsen et al. ................ 310/232 |
| 6,191,687 | B1 | | 2/2001 | Dlugos |
| 6,304,176 | B1 | | 10/2001 | Discenzo |
| 6,469,499 | B2 | | 10/2002 | Delaporte |
| 6,574,679 | B1 | | 6/2003 | Chliwnyj |
| 6,604,434 | B1 | | 8/2003 | Hamilton |
| 6,612,188 | B2 | | 9/2003 | Hamilton |
| 6,630,894 | B1 | * | 10/2003 | Boyd et al. ..................... 341/22 |
| 6,639,544 | B2 | * | 10/2003 | Yamada et al. ................ 342/71 |
| 6,661,220 | B1 | * | 12/2003 | Glehr .................... 324/207.17 |
| 2002/0054719 | A1 | * | 5/2002 | Takizawa et al. |
| 2004/0040391 | A1 | * | 3/2004 | May |
| 2004/0100100 | A1 | * | 5/2004 | Wilson |
| 2005/0026643 | A1 | * | 2/2005 | White et al. |
| 2005/0127776 | A1 | * | 6/2005 | Greene ........................ 310/239 |
| 2007/0046480 | A1 | * | 3/2007 | Stein .......................... 340/601 |

FOREIGN PATENT DOCUMENTS

| | | | | |
|---|---|---|---|---|
| DE | 19816831 | A1 | * | 10/1999 |
| DE | 10308683 | B3 | * | 4/2004 |
| EP | 286095 | A1 | * | 10/1988 |
| EP | 1130373 | A2 | * | 9/2001 |
| GB | 2085167 | A | * | 4/1982 |
| GB | 2307044 | A | * | 5/1997 |
| JP | 07280507 | A | * | 10/1995 |
| WO | WO 8701527 | A1 | * | 3/1987 |

OTHER PUBLICATIONS

Scott Meninger, et al, "Vibration-to Electric Energy Conversion," 1999, p. 48-53, Advanced Sensors Consortium.

C. Shearwood, et al, "Development of an electromagnetic microgenerator," Electronic Letters, Oct. 23, 1997, vol. 33, #22, p. 883-884.

C.B. Williams, et al, "Feasibility study of vibration-electric generator for bridge vibration sensors," IMAC-XVI Proceedings, 1997, p. 1111-1117.

Shenck, et al, "Energy Scavanging with Shoe-Mounted Piezoelectrics," IEEE computer Society, May 2001, 22 pages, http://computer.org/micro/homepage/may_june/shenck/index.htm.

Brian Esser, et al, "Wireless Inductive Robotic Inspection of Structures," Proceedings of IASTED International Conference Robootics and Applications 2000, 8/14-16/00, p. 1-6.

David J. Dlugos, et al, "The Weigand Effect as an Energy Generator," Jul. 20, 2000.

Neil N.H. Ching, et al, A laser-micromachined multi-modal resonating power transducer for wireless sensing systems, 2002, Sensors and Actuators, A 97-98(2002) p. 685-690.

\* cited by examiner

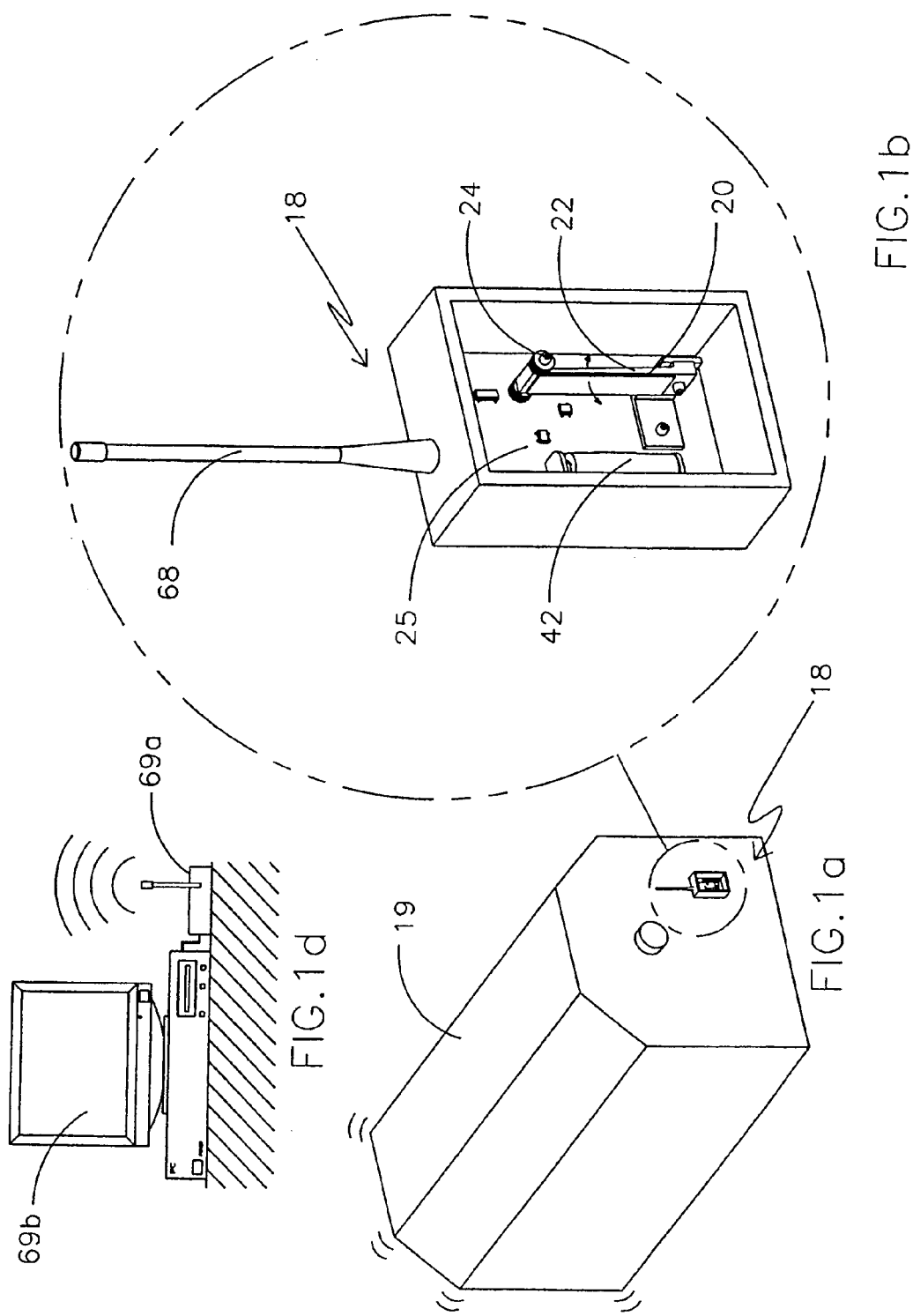

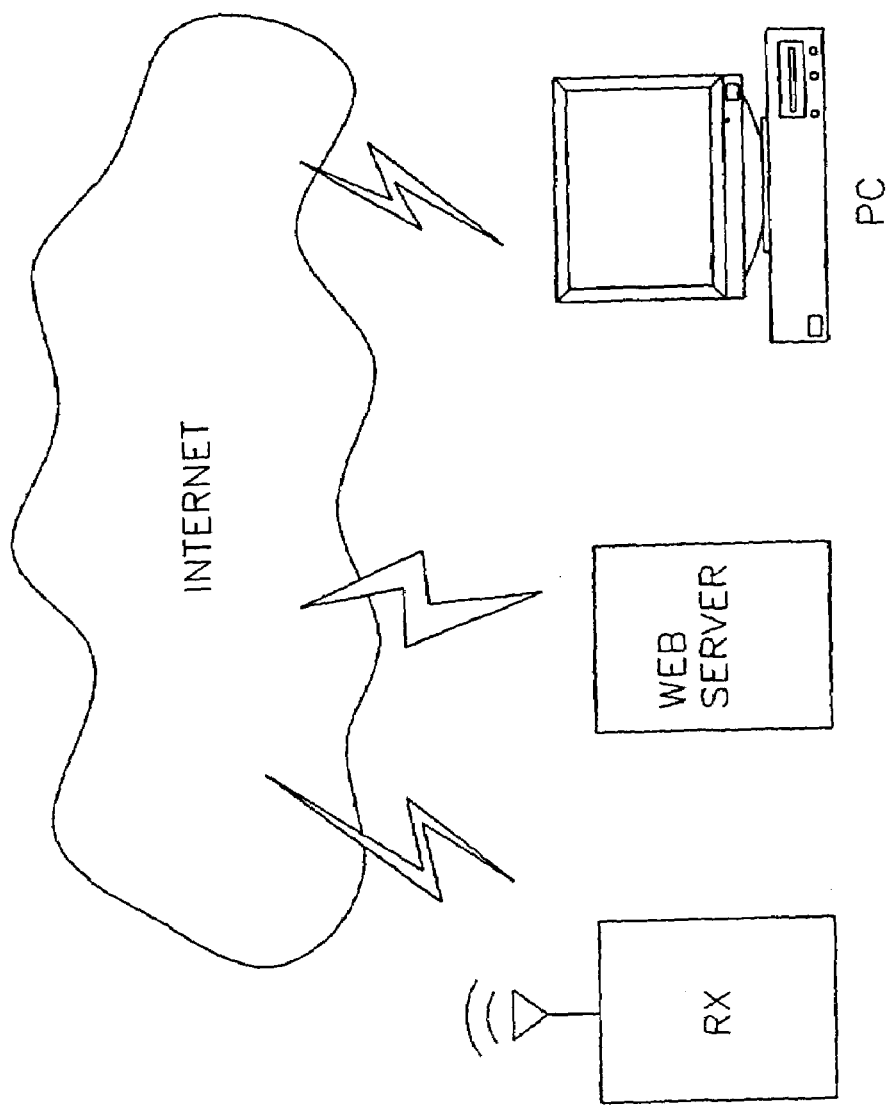
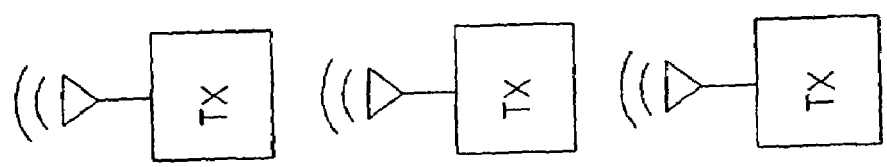
FIG. 12

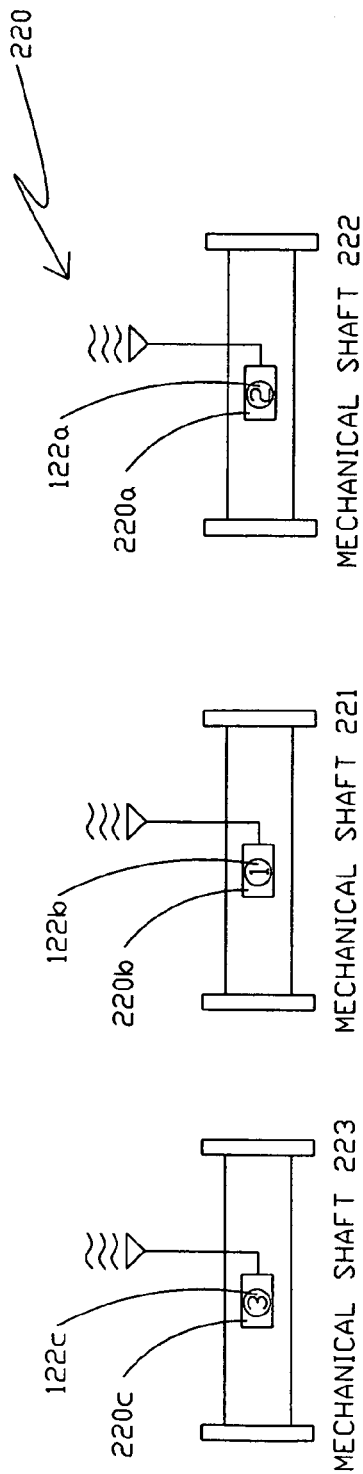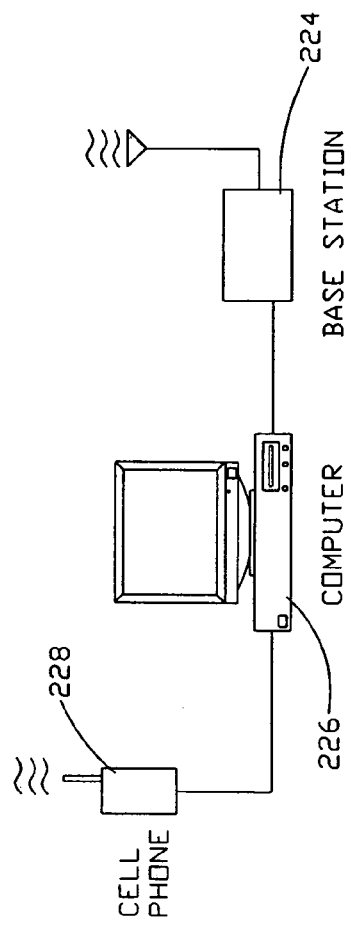
FIG. 19

SHAFT MOUNTED ENERGY HARVESTING FOR WIRELESS SENSOR OPERATION AND DATA TRANSMISSION

RELATED APPLICATIONS

This patent application is related to the following U.S. patent applications:
Ser. No. 09/731,066, filed Dec. 6, 2000, incorporated herein by reference;
Ser. No. 09/757,909, filed Jan. 10, 2001, incorporated herein by reference;
Ser. No. 09/801,230, filed Mar. 7, 2001, incorporated herein by reference;
Ser. No. 09/768,858, filed Jan. 24, 2001, incorporated herein by reference;
Ser. No. 09/114,106, filed Jul. 11, 1998, incorporated herein by reference;
Ser. No. 09/457,493, filed Dec. 8, 1999, incorporated herein by reference;
Ser. No. 60/362,432, filed Mar. 7, 2002, incorporated herein by reference;
Ser. No. 60/443,120, filed Jan. 28, 2003, incorporated herein by reference;
Ser. No. 10/379,224, incorporated herein by reference; and
Ser. No. 10/379,223, filed Mar. 5, 2003, incorporated herein by reference.

This application is a continuation-in-part of the Ser. No. 10/379,223 application.

FIELD OF THE INVENTION

This invention generally relates to collecting and transmitting data. More particularly, it relates to a device for sensing, storing and transmitting data. Even more particularly, it relates to a device that can that can be attached to a structure or live subject and that can harvest energy from its environment to power sensing, storing and transmitting data about the structure or live subject.

BACKGROUND OF THE INVENTION

Several available devices convert mechanical energy in the local environment into electrical energy, including the Seiko "Kinetic" watch and mechanical wind-up radios. An article, "Energy Scavenging with Shoe-Mounted Piezoelectrics," by N. S. Shenck and J. A Paradiso reports on systems that capture energy from the user's environment to provide electricity to wearable microelectronic devices without batteries. The unobtrusive devices scavenge electricity from the forces exerted on a shoe during walking. The devices include a flexible piezoelectric foil stave to harness sole-bending energy and a reinforced piezoelectric dimorph to capture heel-strike energy. They also report on prototype development of radio frequency identification (RFID) tags which are self powered by a pair of sneakers.6 A recent report by Meniger et al., entitled "Vibration-to-Energy Conversion", discloses a microelectromechanical system (MEMs) device for the conversion of ambient mechanical vibration into electrical energy through the use of a variable capacitor However, these MEMs systems only demonstrated 8 microwatts of power. Transmission of RF data over distances of 20 feet or more requires milliwatt power levels.

Low power sensors have been developed, as described on commonly assigned U.S. patent application Ser. No. 09/731,066, to Arms, that includes a sensing unit for attaching to a structure or live subject for sensing a parameter of the structure or live subject. The sensing unit includes a sensor, a data storage device, and a transmitting device. The data storage device is for storing data from the sensor. Power is provided by a power supply such as a rechargeable battery or fuel cell. The rechargeable battery can be recharged by inductive coupling from an external control unit.

Over the past years, sensors, signal conditioners, processors, and digital wireless radio frequency (RF) links have become smaller, consumed less power, and included higher levels of integration. The Ser. No. 09/731,066 application, for example, provides sensing, acquisition, storage, and reporting functions. Wireless networks coupled with intelligent sensors and distributed computing have enabled a new paradigm of machine monitoring.

A paper, "Wireless Inductive Robotic Inspection of Structures," by Esser, et al, proceedings of the IASTED International Conference, Robotics and Applications 2000, August 14-16, 2000, Honolulu, Hi., describes an autonomous robotic structural inspection system capable of remote powering and data collection from a network of embedded sensing nodes and providing remote data access via the internet. The system uses microminiature, multichannel, wireless programmable addressable sensing modules to sample data from a variety of sensors. The nodes are inductively powered, eliminating the need for batteries or interconnectLng lead wires.

Wireless sensors have the advantage of eliminating the cost of installing wiring. They also improve reliability by eliminating connector problems. However, wireless sensors still require system power in order to operate. If power outages occur, critical data collected by the sensors may be lost. In some cases, sensors may be hardwired to a vehicle's power system. In other cases however, the need to hard wire to a power system defeats the advantages of wireless sensors, and this may be unacceptable for many applications. Most prior wireless structural monitoring systems have therefore relied on continuous power supplied by batteries. For example, in 1972, Weiss developed a battery powered inductive strain measurement system, which measured and counted strain levels for aircraft fatigue. Traditional batteries, however, become depleted and must be periodically replaced or recharged, adding an additional maintenance task that must be performed. This is particularly a problem for monitors used for a condition based maintenance program since it adds additional maintenance for the condition based monitoring system itself.

None of the systems for sensing changes in the environment have collected available mechanical energy to provide the electricity for running the sensors, storing data from the sensor, or communicating the data externally. Thus, a better system for powering sensors and storage devices, and for transmitting data gathered by sensors is needed, and this solution is provided by the following invention.

SUMMARY OF THE INVENTION

It is therefore an object of the present invention to provide a scheme for powering a wireless sensor system with a source of energy that avoids the need to provide, replace or recharge batteries;

It is a further object of the present invention to provide a scheme for powering a load with energy harvested from an ambient source of energy in the local area, wherein the rate at which energy is harvested from the ambient source of energy is below that required for directly powering the load.

It is a further object of the present invention to provide a scheme for powering a sensor system with ambient mechanical energy collected from the environment of the sensor system or with energy obtained from ambient magnetic field coupled energy;

It is a further object of the present invention to provide a network of sensor systems in which sensors on the network are powered with ambient energy collected from the environment;

It is a further object of the present invention to provide a device for monitoring the health of a machine or another system in which the monitoring device is powered with ambient energy harvested from the environment.

It is a further object of the present invention to provide a sensing system that includes a sensor that is read with electrical energy obtained from the harvested mechanical energy;

It is a further object of the present invention to provide a wireless transmitter connected to receive and transmit information obtained by the sensor, in which the wireless transmitter is powered with electrical energy obtained from the harvested mechanical energy;

It is a feature of the present invention that a sensing system includes a component for harvesting ambient mechanical or magnetic energy and converts this energy into electrical energy;

It is a feature of the present invention to provide a data collection device that is powered by the electrical energy obtained from the harvested mechanical energy;

It is an advantage of the present invention that the data collection device can provide information about the environment using energy harvested from the environment; and It is a further advantage of the present invention that the data collection device does not itself require maintenance for replacing or recharging batteries.

These and other objects, features, and advantages of the invention are accomplished by a device for powering a load from an ambient source of energy. The device comprises an energy harvesting device for harvesting energy from the ambient source of energy wherein the rate energy is harvested from the ambient source of energy is below that required for directly powering the load. A storage device is connected to the energy harvesting device. The storage device receives electrical energy from the energy harvesting device and is for storing the electrical energy. A controller is connected to the storage device for monitoring the amount of electrical energy stored in the storage device and for switchably connecting the storage device to the load when the stored energy exceeds a first threshold.

Another aspect of the invention is an energy harvesting system comprising a piezoelectric transducer and a rectifier. The system also includes a reactive device having a high impedance approximately matching impedance of the piezoelectric transducer at its operating frequency for efficiently transferring energy from the piezoelectric transducer to the reactive device. The system also includes a low impedance high capacity storage device. The system also includes a circuit for monitoring voltage across the reactive device, and for transferring the charge from the reactive device to the low impedance high capacity storage device when the voltage across the reactive device reaches a specified voltage value.

Another aspect of the invention is a device for sensing temperature or pressure in a tire. The device includes a tire and a PZT mounted on the tire. The device also includes a circuit for harvesting energy from the PZT, wherein the circuit comprises an element having an impedance approximately matching impedance of the PZT. The device also includes a sensing module connected to the circuit, the sensing module including a sensor and a circuit for wirelessly transmitting sensor information.

BRIEF DESCRIPTION OF THE DRAWINGS

The foregoing and other objects, features, and advantages of the invention will be apparent from the following detailed description of the invention, as illustrated in the accompanying drawings, in which:

FIG. 1a is a perspective view of an energy harvesting addressable wireless sensing node of the present invention mounted on a machine or structure;

FIG. 1b is a perspective view of components within the energy harvesting addressable wireless sensing node;

FIG. 1d is a schematic diagram of a base station for receiving said wirelessly transmitted information;

FIG. 11a is a block diagram of an improved embodiment of an energy harvesting addressable wireless sensing node of the present invention having an additional stage of charge storage, monitoring, switching, and impedance conversion between the rectifier and the controller of FIG. 3a;

FIG. 11b is a schematic diagram showing more detail than the block diagram of FIG. 11a; and FIG. 12 is a schematic diagram showing a wireless web enabled sensor network (WWSN) system that requires very little power.

FIG. 19 is a block diagram of a network of systems of the present invention.

DETAILED DESCRIPTION OF THE INVENTION

Figure 1C:
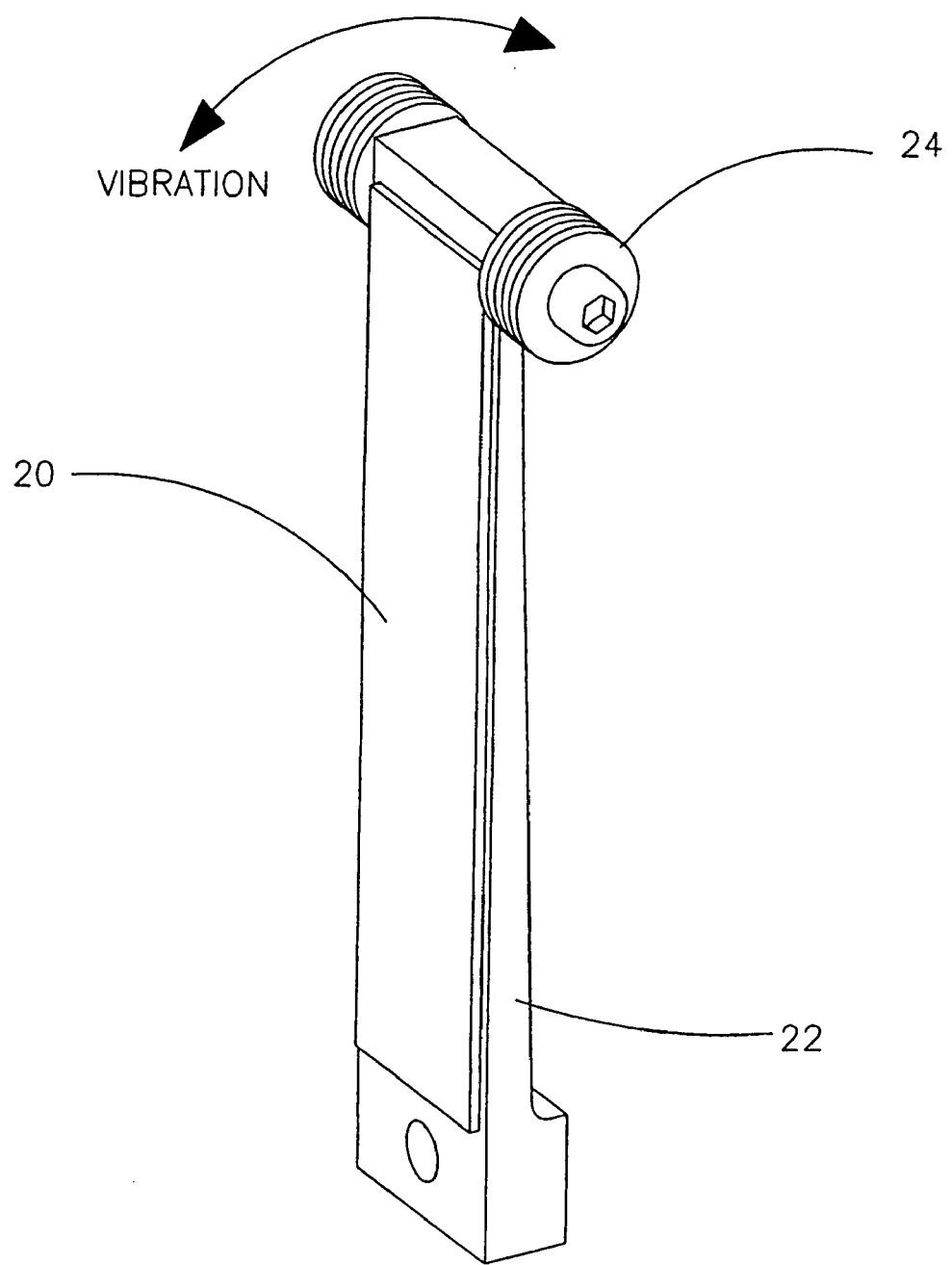
FIG. 1c is a perspective view of the energy harvesting cantilever shown in FIG. 1b with variable mass for tuning to a vibration frequency of the machine or structure.

The present inventors recognized that substantial efficiency in collecting, storing, and transmitting data from wireless sensors could be provided by harvesting energy from the environment.

This invention is aimed at developing a new class of sensing systems that can wirelessly report data without the need for maintaining or replacing batteries. Instead, the sensing systems rely on harvesting vibration, strain energy, or magnetic coupled energy from the local environment for conversion to electrical power for storage and use to collect, store, or transmit data by the sensing system. Thus, machines, structures, and live subjects can be monitored without the need for replacing or recharging batteries or for a battery maintenance schedule. Truly smart structures and machines will thus be able to autonomously report their condition throughout their operating life without the mechanism used for reporting the data itself requiring maintenance. The system can be used to run and communicate with actuators as well as sensors.

One important use of the present invention is to improve traditional condition based maintenance. Condition based maintenance provides a more accurate and cost effective maintenance program for equipment or structures. The present invention reduces unnecessary preventive maintenance for the devices used to monitor. In addition to providing for wireless communication without batteries, the present invention provides the components necessary to realize the potential benefits of condition based monitoring, including information acquisition, analysis, storage, and reporting technologies that substantially lower power requirements, making energy harvesting for condition based maintenance a realistic source of energy.

An illustration of condition based maintenance and another important use for the present invention is aboard ships where batteryless sensing systems may be used for wirelessly monitoring oil debris or oil condition, tank & hull corrosion, combustion pressure, water-lubricated-bearing wear, and machine condition. The invention can also be used for integrated, hierarchical machinery diagnostics & prognostics; machinery diagnostics & prognostics; open systems architecture condition based maintenance; human—computer interface condition based maintenance; and diagnostic of insulation, such as wire and windings. The invention can also be used on land vehicles or aircraft for purposes such as to monitor and report tire temperature and pressure. In each case mechanical energy, such as the energy of vibration of the vehicle, can be used to power the sensor and its storage or communications apparatus.

Batteries, and the additional maintenance burden for replacing or recharging batteries, are avoided in the present invention by providing wireless sensing network systems which can harvest energy from the local environment to provide the power needed for their own operation.

Numerous sources of ambient energy can be exploited for energy harvesting, including solar, wind, thermoelectric, water/wave/tide, rotation, strain, and vibration. For shipboard monitoring applications below deck and for monitoring tire pressure and temperature, mechanical energy harvesting devices, such as those that harvest strain or vibrational energy are preferred. In Navy applications, strain energy would be available on engine mounts, ship hull sections, and structural support elements. Vibrational energy would be available on diesel turbine engine components, propeller shaft drive elements, and other machinery and equipment. This energy could be harvested using electromagnetic devices (coil with permanent magnet), Weigand effect devices, and piezoelectric transducer (PZT) materials. Of these, the PZT materials hold the most promise.

Recent developments in single crystal PZT have led to significant improvements in the mechanical-to-electrical conversion coefficients (coupling coefficients), from 60% efficiency to 90% efficiency. Single crystals also exhibit higher operating strain capabilities than conventional PZT materials (0.2% vs. 1.4%). These materials are available through TRS Ceramics (State College, PA).

Furthermore, PZT fibers have recently been made commercially available at low cost for active damping of sporting equipment, such as baseball bats, tennis rackets, and skis (Advanced Cerametiics, Lambertville, N.J.). These fibers may be directly bonded to a straining element or structure to generate electrical energy that can be harvested. Major advantages of these fiber piezoelectric materials is that they can tolerate the loss of many individual fibers in a bundle and still function well. Since they are in mass production, they may be obtained readily and at relatively low cost. Because of these advantages the present invention describes the use of these PZT materials for energy harvesting wireless sensor networks. However, other devices and other sources of ambient energy can also be used.

The present inventors have used single crystal and PZT fibers to create working energy harvesting prototypes that provide sufficient energy to power StrainLink wireless sensor transmitters available from MicroStrain, Inc.

Energy harvesting addressable wireless sensing node 18 can be attached to machine or structure 19 that is subject to vibration, as shown in FIG. 1a. In one embodiment, PZT 20 is mounted to cantilever 22 which can be tuned with variable mass 24, as shown in FIGS. 1b and 1c, to provide a device resonance frequency close to the vibration frequency of machine or structure 19, thereby optimizing energy harvesting. PZT 20 can be either a crystal or a fiber. Cantilever 22 is mounted on PC board 25 in enclosure 26.

Figure 2:
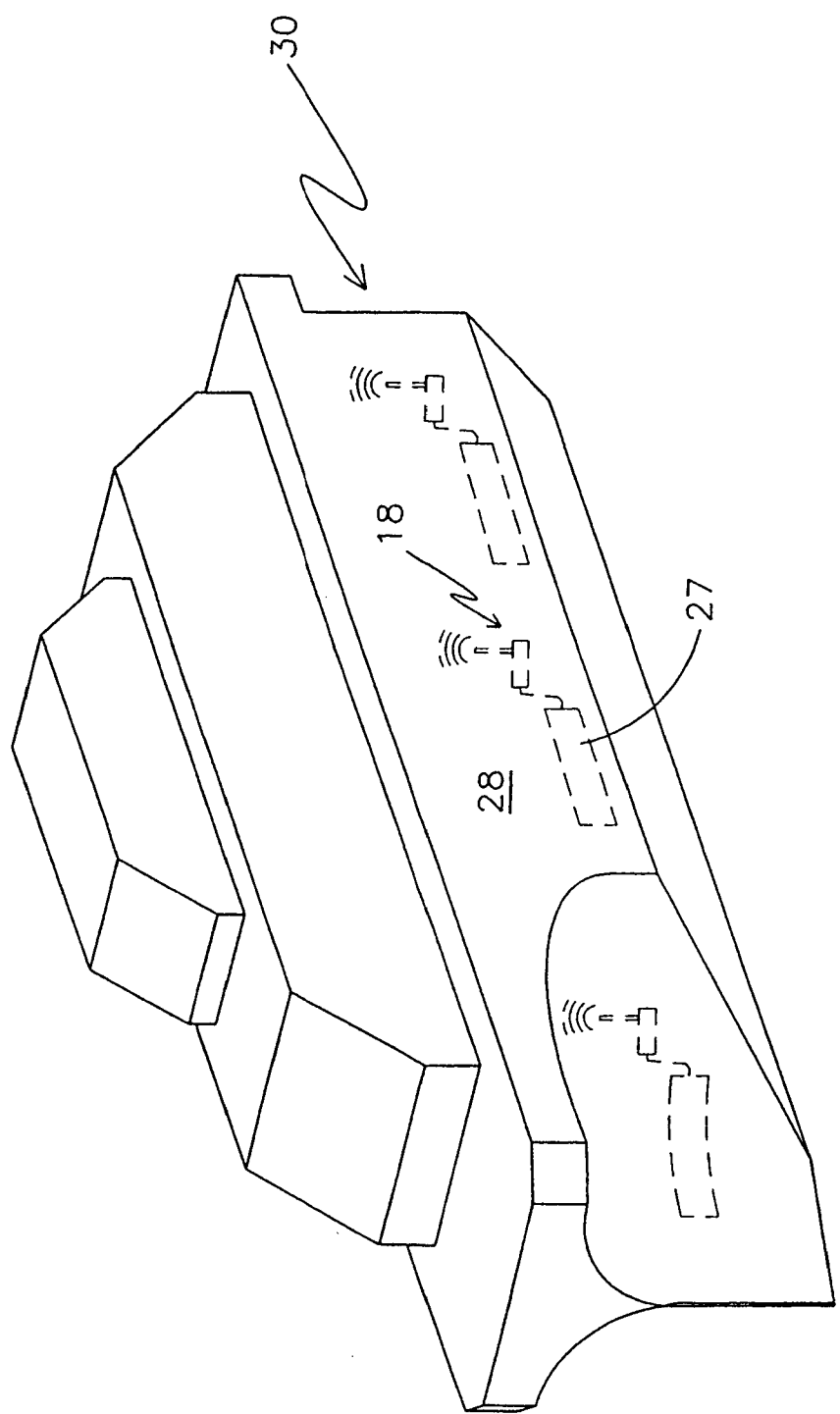
FIG. 2 is an alternative embodiment in which a large sheet of PZT fiber is embedded in material, such as a hull of ship so vibration or strain energy transmitted through the hull can be harvested.

Alternatively, a large sheet of PZT fiber 27 can be embedded in material of hull 28 of ship 30 so vibration or strain energy transmitted through hull 28 can be harvested, as shown in FIG. 2. Large sheets of PZT fiber 27 are preferred because tuning is not readily available to harvest the strain energy. A structure, such as hull 28 or the deck of a bridge bends only a limited amount, and the bending cannot be tuned as can flexural element by adjusting mass so as to take advantage of resonance frequency to harvest more of the energy.

Figure 3A:
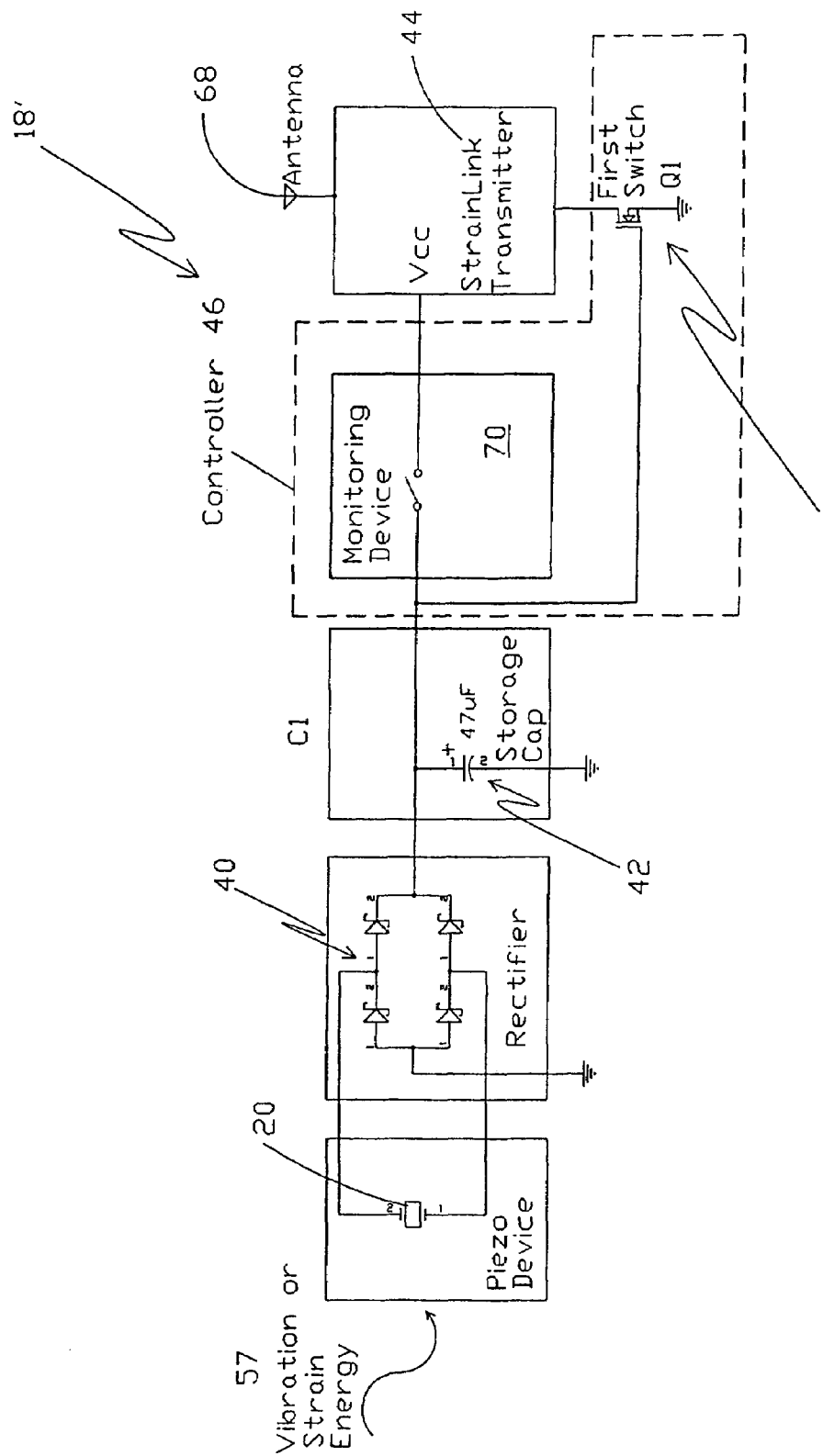
FIGS. 3a, 3b are block diagrams of one embodiment of an energy harvesting addressable wireless sensing node of the present invention in which energy is harvested by a PZT.

In the mechanical vibration embodiment, the source of mechanical energy, such as machine or structure 19, is converted to electrical energy in energy harvesting addressable wireless sensing node 18', which includes a miniature electric generator, such as PZT 20, as shown in FIG. 3*a*. A miniature electric generator can also be provided with a coil and magnet in relative rotational motion, as for example, would be available in the vicinity of spinning machinery or wheels.

Electrical power generated in PZT 20 is rectified in rectifier 40, stored in electrical storage device 42, and once sufficient energy has been stored, is provided to a load, such as wireless sensing module 44, by means of controller 46.

Figure 3B:
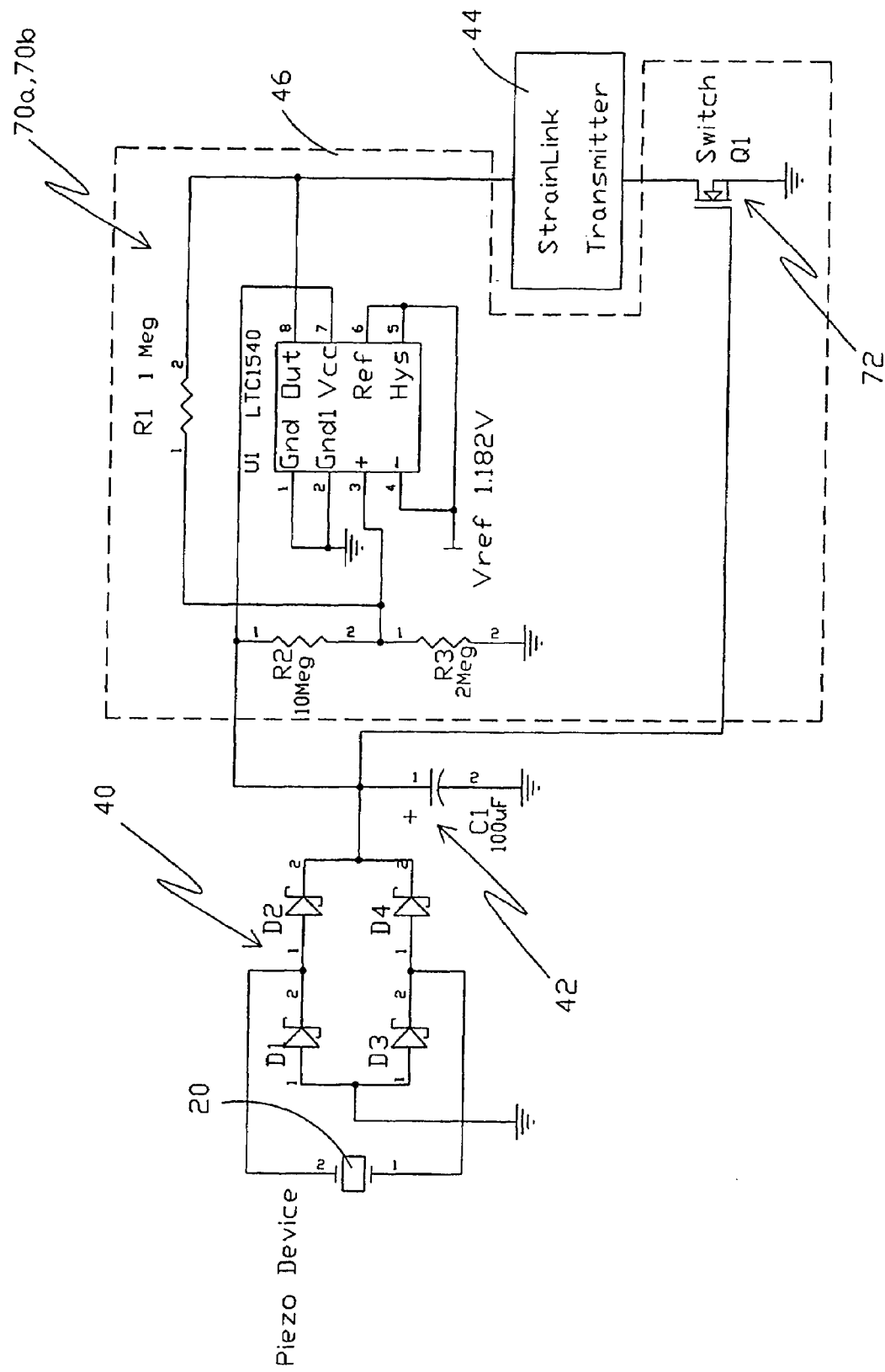

In one experiment, a single crystal PZT 20 was connected to the circuit shown in FIGS. 3*a*, 3*b*, while vibration was applied to PZT 20. With a DC voltmeter across storage capacitor 42, upwards of 20 volts was measured across the capacitor with approximately 0.08 inch deflection of the PZT 20 at a 50 Hz rate.

PZT 20 is inherently a high impedance device which provides a nearly constant current, so the storage capacitor charges linearly with time. Thus, the time for storage capacitor 42 to charge is found from T=CV/I where C=capacitance value, V=voltage charged to, and I=the charging current.

The Microstrain StrainLink transmitter is also a constant current load, so calculating the discharge uses the same formula. A 47 uF cap charged to 16 volts will supply 2.8 mA for 268 mS discharging to zero volts. A low power Strain-Link transmitter can be connected as load 44 in the circuit of FIGS. 3*a*, 3*b* and can run for 224 mS before reaching the reset voltage of 2.63 volts. This is enough time to transmit data from several sensors. Obviously a bigger storage capacitance would supply a longer operating time as would any reduction in load current presented by the transmitter. However, a longer time would be needed to charge a larger capacitor. Furthermore, the practicality of such a system is dependant on the continued availability of vibration input energy. Thus, the present device is ideally suited to applications where ambient vibration is continuous for long periods to provide for the self-discharge rate of storage capacitor 42, to provide power consumed by the circuit used to monitor charge and switch on the load, as well as to power the load.

Figure 4:
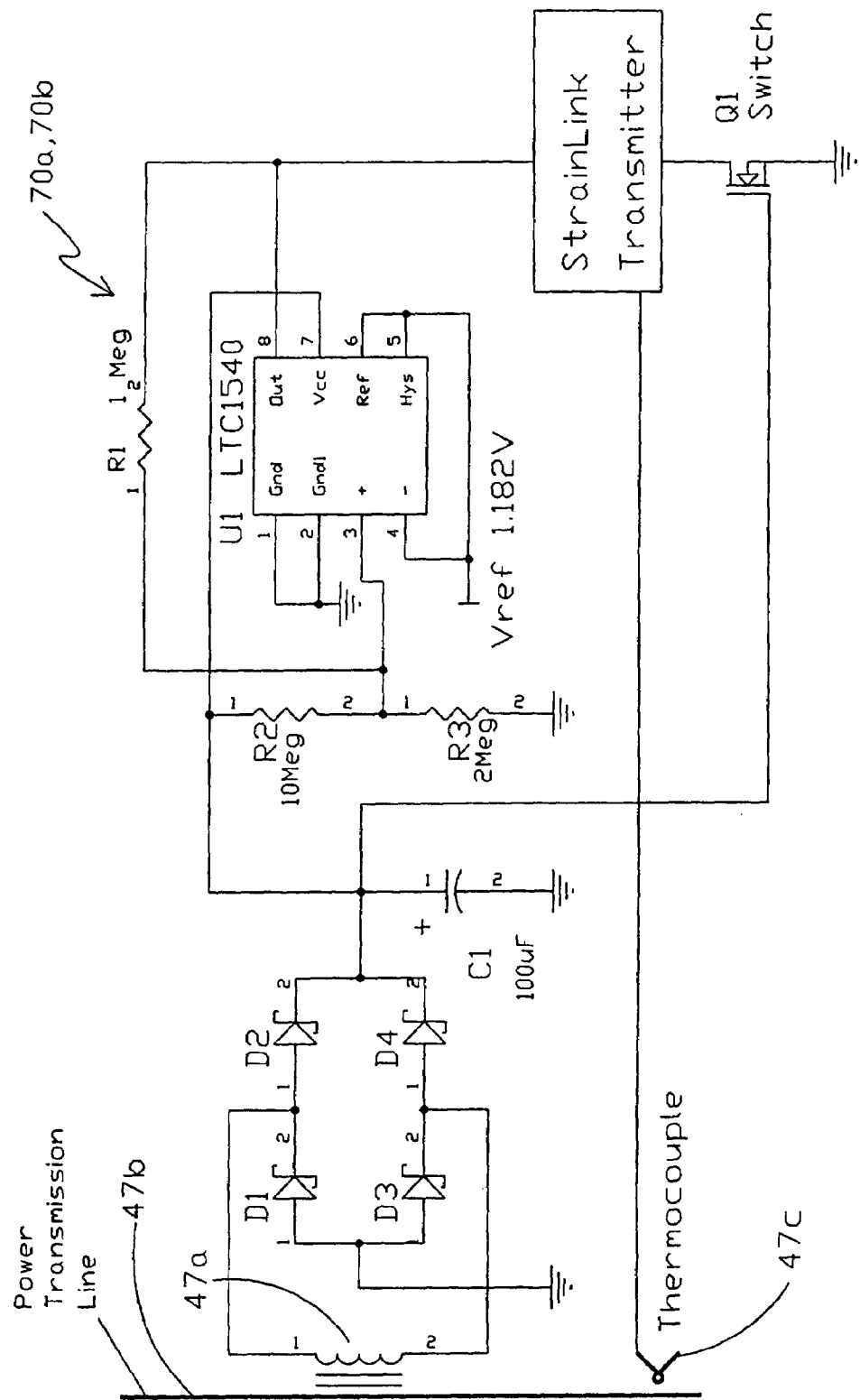
FIG. 4 is a block diagram of an alternate embodiment of an energy harvesting addressable wireless sensing node of the present invention in which energy is harvested from a power transmission line.

In an alternative embodiment PZT 20 device could be replaced with coil winding 47*a* that is closely coupled to power transmission line 47*b* that would allow energy in the magnetic field around the transmission line to be harvested, as shown in FIG. 4. Such a configuration could be used with thermocouples 47*c* to measure the temperature of transmission line 47*b* and detect an overheated condition in transmission line 47*b*. As with the PZT embodiment, the frequency of transmissions is proportional to current in the transmission line 47*b*.

Figure 5:
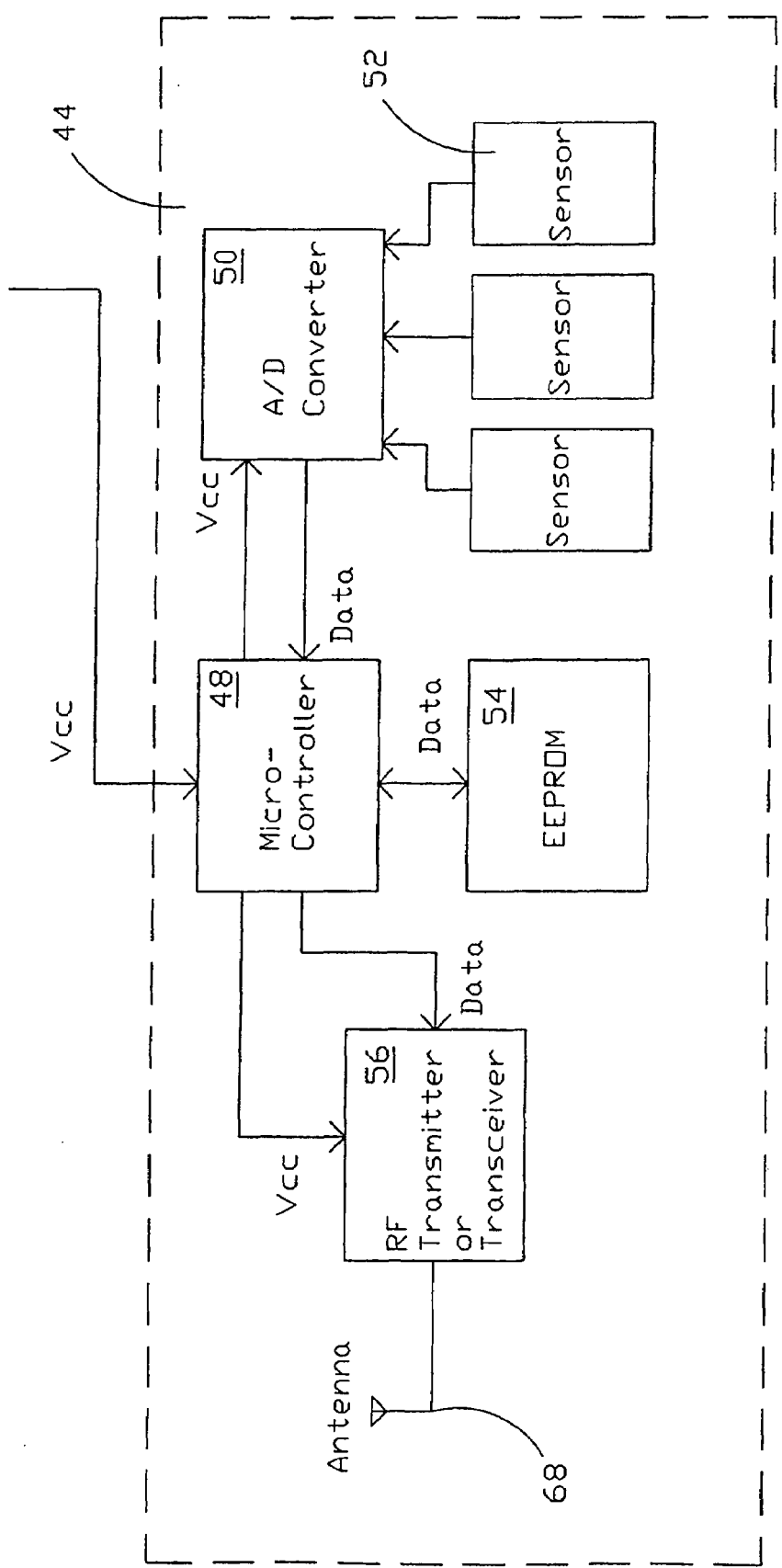
FIG. 5 is a block diagram of the wireless sensing module shown in FIGS. 3a, 3b.

Wireless sensing module 44 includes microcontroller or microprocessor 48, which controls provision of power to A/D converter 50, sensors 52, non-volatile memory 54, and RF transmitter 56, as shown in FIG. 5. Sensors can include such sensors as a temperature sensor, a strain gauge, a pressure sensor, a magnetic field sensor, an accelerometer, or a DVRT. By selectively providing power to or withholding power from these devices microcontroller 48 can achieve substantial energy savings. Microcontroller 48 also controls flow of data from A/D converter 50, from sensors 52, to and from nonvolatile memory 54 and to RF transmitter 56. A transceiver can be provided instead of RF transmitter 56 to enable two way communication, all powered by ambient vibrational energy.

The strain or vibrational energy 57 from the ambient environment is provided to PZT transducer 20 mounted on a machine, structure, or live subject, as shown in block diagram form in FIG. 3*a* and in schematic form in FIG. 3*b*. As indicated above, electrical output of PZT 20 is rectified in rectifier 40. DC output of rectifier 40 charges storage capacitor 42. Controller 46 monitors charge stored on storage capacitor 42, and when sufficient, provides Vcc power to wireless sensing module 44 for transmitting sensor data through antenna 68 to receiver 69*a* on base station 69*b* (FIG. 1*d*). Receiver 69*a* can be a transceiver. Controller 46 includes monitoring device 70, and switch Q1, which is formed of MOSFET transistor 72. When voltage across capacitor 42 is sufficient, monitoring device 70 turns on to provide Vcc to wireless sensing module 44. To reduce leakage and ensure that wireless sensing module 44 remains fully off and does not load storage capacitor 42 when voltage across storage capacitor 42 is below a threshold, transistor 72 is provided. When transistor 72 turns on, ground connection from wireless sensing module 44 is established.

Transistor 72 is needed because when voltage provided by storage capacitor 42 is too low, monitoring device 46 cannot provide its output in a known state. Monitoring device 46 may turn on falsely and load down storage device 42, preventing it from ever charging up. Monitoring device 46 is not itself a reliable switch unless supply voltage is above a threshold. To provide for operation in the regime when supply voltage is below that threshold, switch 72 is provided to ensure that wireless sensing module 44 remains fully off. Switch 72 connected between wireless sensing module 44 and ground and to has a single threshold.

In operation in one embodiment, monitoring device 70 becomes valid at 1.8 volts. Switch Q1 transistor 72 turns on at 2.0 V, enabling wireless sensing module 44 when storage capacitor 42 has sufficient charge to operate monitoring device 70 properly and can hold it off. Finally, when voltage at storage capacitor 42 reaches 6.3 V monitoring device 70 turns on and transfers charge from storage capacitor 42 to power wireless sensing module 44 for a brief period, until voltage discharges back to 2.9 volts, at which point monitoring device 70 turns off further transfer, and monitoring device 70 therefore continues to be in a valid state for subsequent operation, well above the 1.8 volts level needed for proper operation in a determinate state.

Thus, when sufficient charge is provided to storage capacitor 42 to provide a voltage equal to a higher threshold, monitoring device 70 turns on and connects wireless sensing module 44 to storage device 42. This discharges storage device 42 down to a lower threshold voltage at which point monitoring device 70 turns off, disconnecting wireless sensing module 44 from storage device 62. Storage device 42 can then recharge from energy supplied from PZT 20. However, if storage device 42 fully discharges, or if potential across storage device 42 falls below the lower threshold then monitoring device 70 may not be sufficiently powered to operate correctly. It may not fully disconnect wireless sensing module 44 from storage device 42, and thus, wireless sensing module 44 may continue to load storage device 42, preventing it from ever recharging. To prevent this possibility, switch 72 is provided which disconnects wireless sensing module 44 from ground when potential across storage capacitor 42 falls somewhat below the lower threshold.

The present inventors found that impedance mismatch between PZT 20 and storage capacitor 42 limits the amount of power that can be transferred from PZT 20 to storage capacitor 42. They recognized that energy transfer was limited by the fact that AC power generated by PZT 20 is presented by the PZT at a very high impedance and at low frequency. They observed that PZT 20 behaves as a constant current source, and that when piezoelectric elements are used to charge capacitors, such as storage capacitor 42, charging is determined by the short circuit current capability of PZT 20. When storage capacitor 42 is charged from a constant current source, such as PZT 20, storage capacitor 42 will charge at a rate proportional to the current provided by the constant current source. They further recognized that since the current available from PZT 20 is low, a long time is needed to charge a large capacitance, such as storage capacitor 42, needed for powering devices such as wireless sensing module 44 or other transmitters. They recognized the further difficulty that the larger leakage current presented by larger capacitors may exceed the charge rate of the constant current provided by PZT 20.

The present inventors developed a circuit that efficiently converts power from a high impedance current source, such as PZT 20, to a low impedance voltage source capable of charging a capacitor or battery storage device. The inventors also developed an efficient way to determine when enough power has been accumulated and applying that accumulated power to a useful purpose.

In addition, the present inventors recognized that if the available power in the piezoelectric element were to be efficiently converted from its low current and high impedance current source to a voltage source, the capacitor could be charged much faster than if the same capacitor were charged directly from the short circuit current of the piezoelectric element without this conversion. For example, if a voltage converter can present a 500K load to the piezoelectric element, approximately matching its impedance, the element will deliver 17.5 volts at 35 uA or 610 microwatts. If this power was then converted down to 100 ohms source impedance, even at 80% efficiency, the charge current would be more than 2.2 mA. By comparison, the output at the same level of excitation of the piezoelectric element when loaded to 100 ohms without a converter, is 6 millivolts at 60 uA or 0.36 microwatts, about 1,700 times less power.

Figure 9:
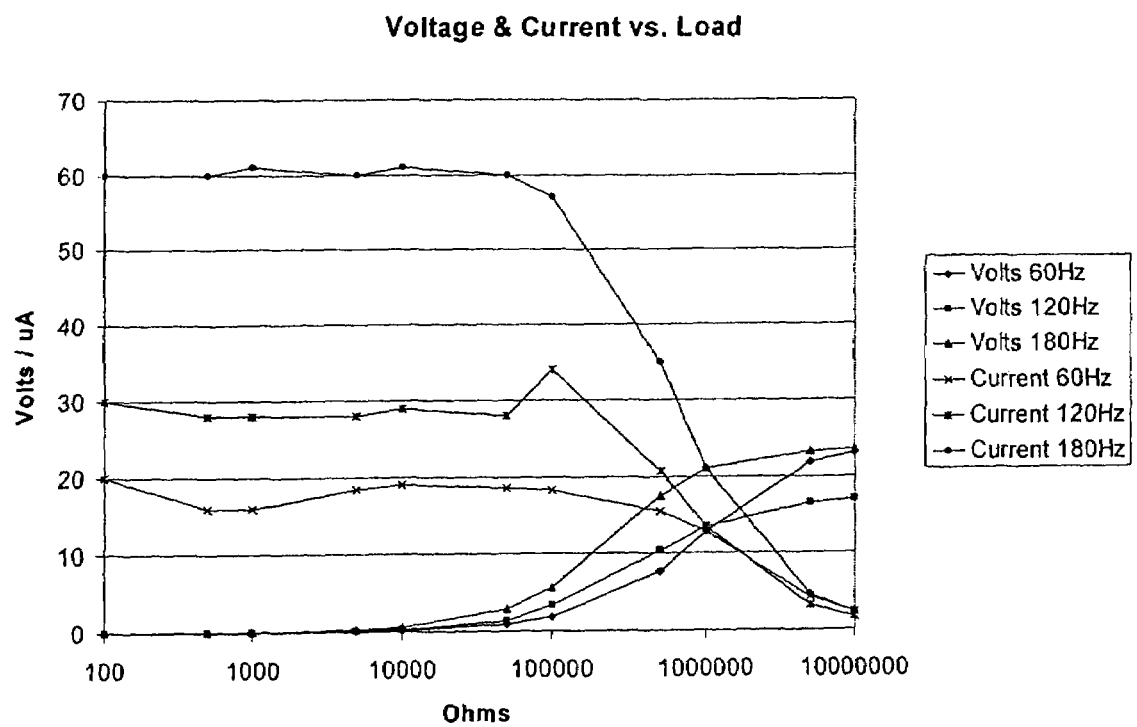
FIG. 9 is a diagram showing data from an experimental test showing that the PZT provided the same low current output as load resistance was varied from 100 ohms to 50 Kohms.
Figure 10:
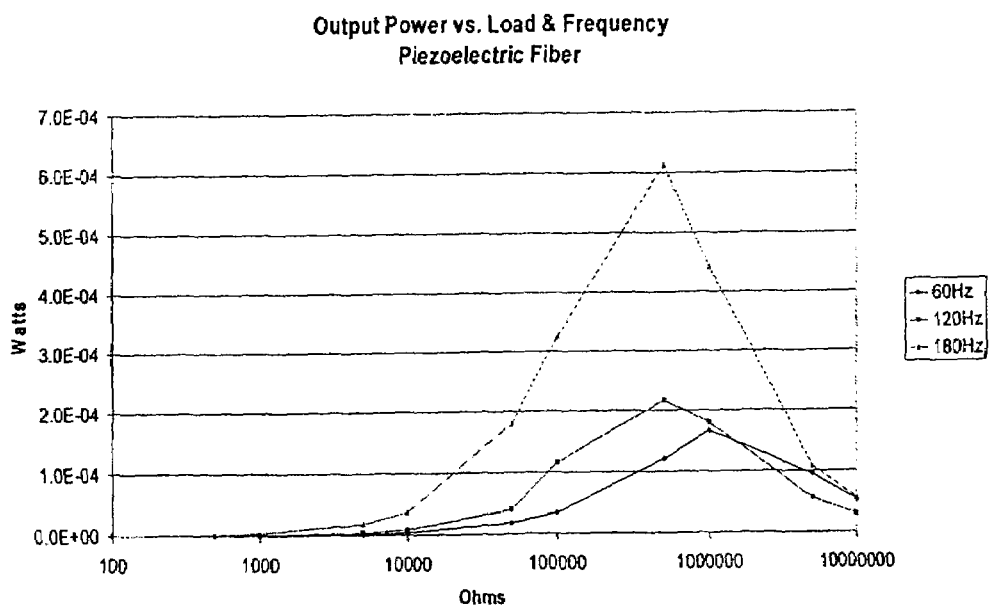
FIG. 10 is a diagram showing data from the experimental test showing that the optimum load impedance, that delivers maximum power, was found to be about 500 Kohms.

The inventors of the present invention conducted empirical tests on a sample of piezoelectric material in order to determine a viable topology of conversion circuit. A test was performed on a sample of highly flexible piezoelectric fiber. The sample was mounted in a 3 point bending jig with a strain gauge attached to the material, and excited to the same strain levels at three different frequencies. A decade resistance substitution box was used to load the output in order to determine the optimum load impedance for maximum power out of the material under these conditions. The same low current was measured as the load resistance was varied from 100 ohms to 50 Kohms as shown in FIG. 9. The optimum load impedance, that delivers maximum power, was found to be about 500 Kohms, as shown in FIG. 10.

The present inventors found that further substantial improvement in energy harvesting is available by adding an impedance converter circuit to the circuit of FIG. 3a that provide better impedance matching to the high impedance of PZT 20, while still finally providing the large capacitance needed to power wireless sensing module 44. The improvement to energy harvesting addressable wireless sensing node 18". illustrated in block diagram form in FIG. 11a and in a schematic diagram in FIG. 11b, provides an additional stage of charge storage, monitoring, switching, and impedance conversion between rectifier 40 and controller 46 of FIG. 3a. In addition to providing more efficient transfer of energy from PZT to long term storage device 42', the improvement allows a much larger capacitor or a battery to be used for that long term storage 42', and this enables more information transfer by wireless sensing module 44.

Figure 6:
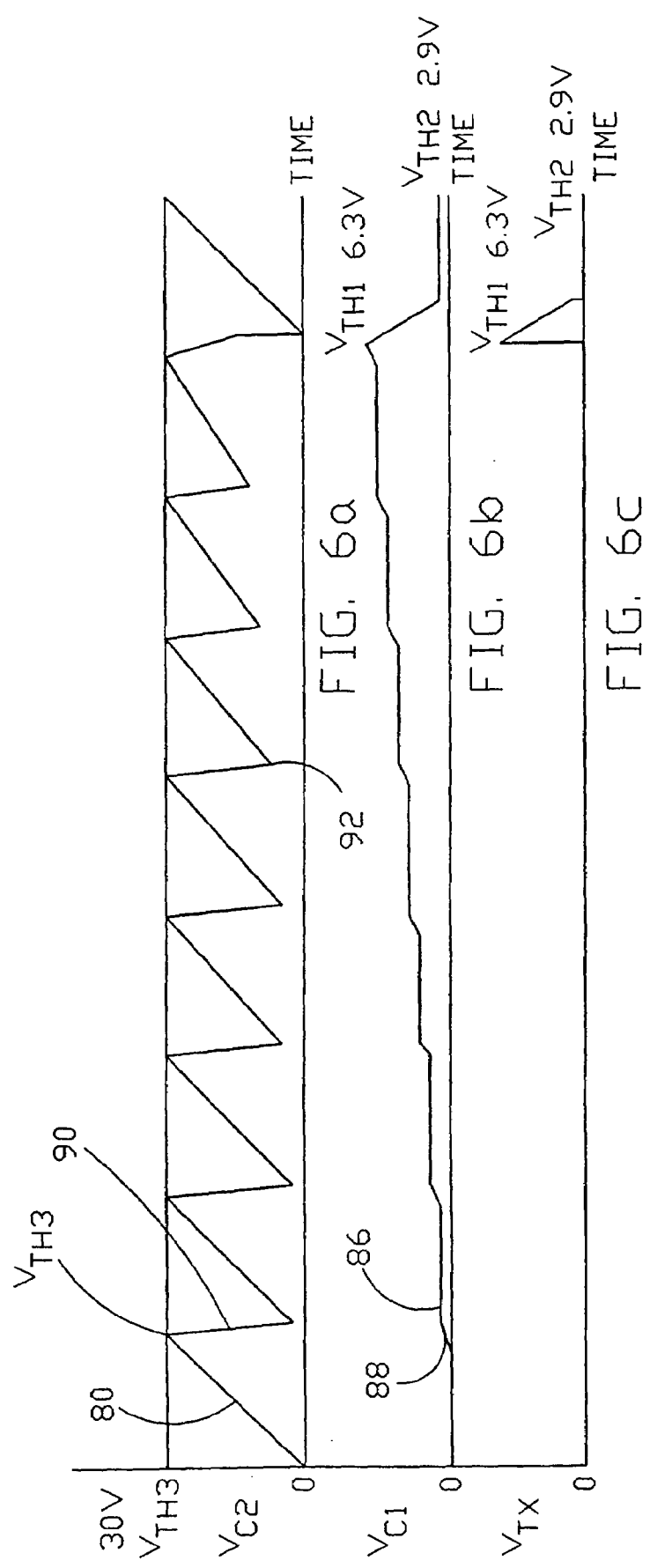
FIG. 6a is a timing diagram of voltage across capacitor C2 of FIG. 11.
FIG. 6b is a timing diagram of voltage across capacitor C1 of FIG. 11.
FIG. 6c is a timing diagram of voltage across the transmitter of FIG. 11 showing how charge gradually stored in long term storage capacitor C1 is used to briefly power the transmitter or transceiver.

PZT 20 connected to a source of mechanical energy, such as vibration or strain 57, produces a high impedance AC voltage in accordance with the strain or vibration 57 applied to PZT element 20. D1 and D2 (FIG. 11b) form Schottky barrier rectifier bridge rectifier 40 that converts the AC voltage from PZT 20 to DC. PZT 20 charges reactance element 78, such as small capacitor C2 along curve 80 until a voltage equal to Vth3 is reached, as shown in FIG. 11a and FIG. 6a.

Voltage Vth3 is sufficient to turn on switch 2, transistor 82 which connects DC-DC converter 84 to ground, enabling DC-DC converter 84 to turn on and operate. When DC-DC converter 84 turns on, it converts the high voltage stored on small capacitor C2 to a low voltage at a low impedance for providing a small boost 86 to the charge on long term storage capacitor 42', capacitor C1, as shown along charging curve 88 in FIG. 6B. While long term storage capacitor C1 is charging, small capacitor C2 is discharging. The discharge of small capacitor C2, is shown along curve 90 in FIG. 6a, providing the charge to boost the voltage of long term storage capacitor C1 by the small step 86 shown in FIG. 6b. Voltage scales are the same on FIGS. 6a, 6b, 6c. Small capacitor C2 continues to discharge through DC-DC converter 84 until voltage on small capacitor C2 equals voltage on long term storage capacitor C1. Thus, as long term storage capacitor C1 charges up, small capacitor C2 discharges less and less fully, as shown by the continuous increase in the discharge voltage level 92 in FIG. 6A with each charging and discharging cycle of small capacitor C2, while the charge level of long term storage capacitor C1 continuously increases.

Although voltage on small capacitor C2 discharges, second switch 82 remains on because of delay introduced by capacitor C3 in parallel with resistor R2 in voltage divider 94. Thus, DC-DC converter 84 remains on while voltage across capacitor C2 drops below Vth3 as shown in FIG. 6A. R4, R5 and second switch 82 form a switch that disables any conversion until enough voltage is present on C2 to convert. This switch threshold is set to approximately 22 volts. DC-DC converter 84 is a high frequency stepdown DC to DC converter that has a typical quiescent current of 12 uA and is capable of 80% efficiency even with small load current. In this embodiment, DC-DC converter 84, U2 is an LT1934-1 (Linear Technology, Milpitas, Calif.). This converter was chosen due to its very low quiescent current.

Figure 11A:
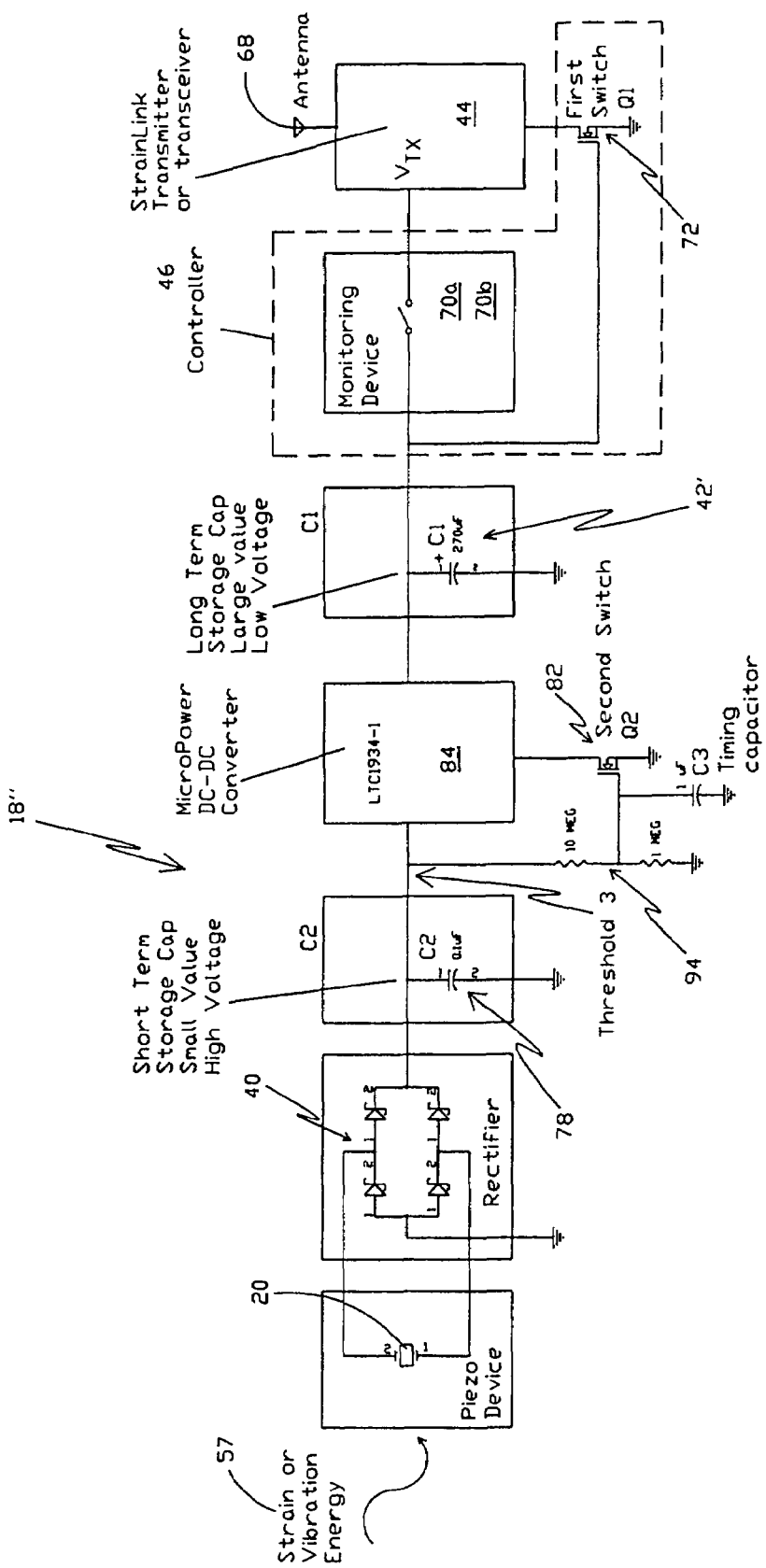
Figure 11B:
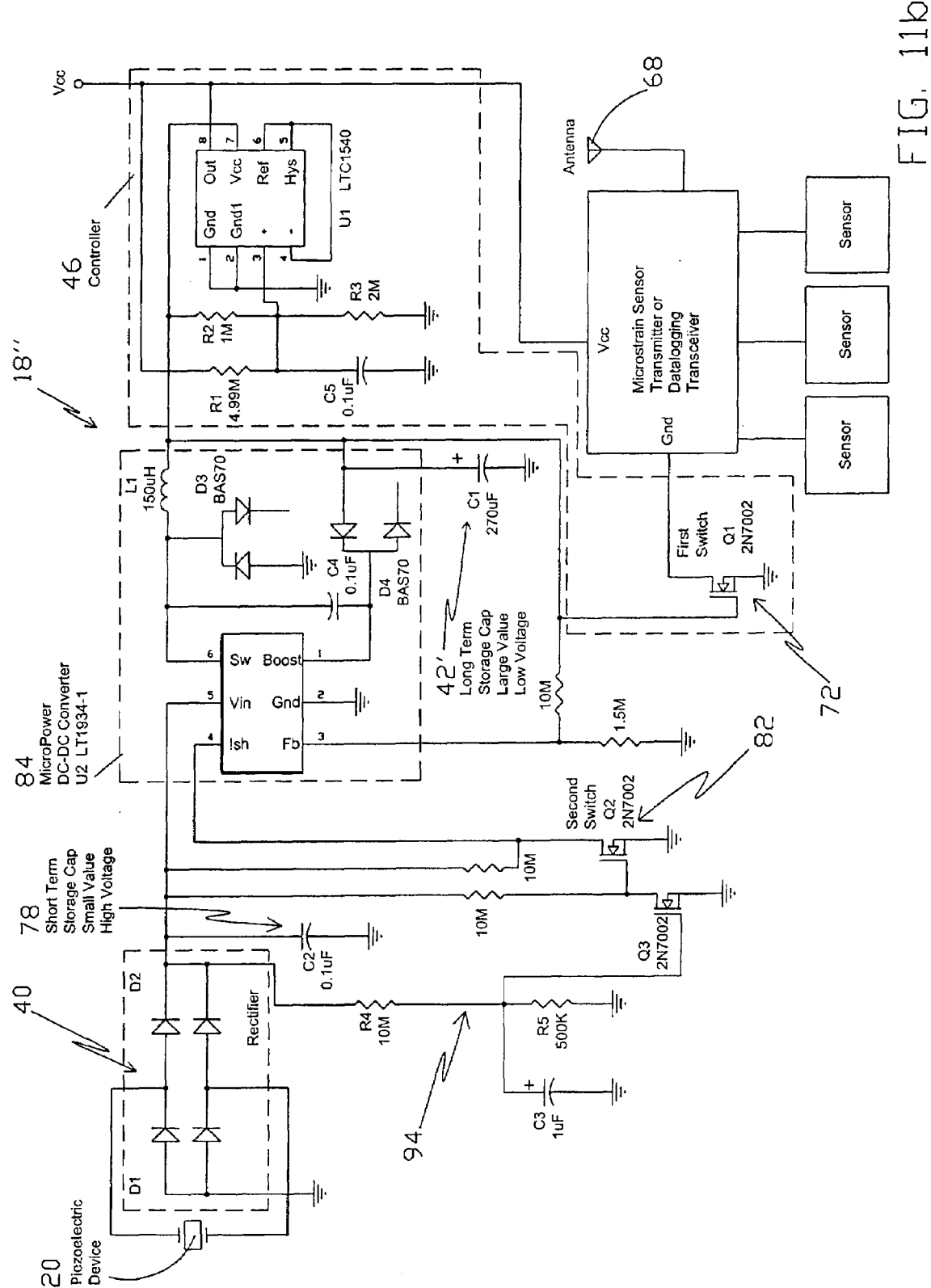

As also described for the circuit of FIGS. 3a and 3b and the circuit of FIGS. 11a and 11b, resistors R1, R2, R3, and comparator U1 form monitoring device 70a and also form voltage sensitive switch 70b that turns off connection to load 44 until enough charge has been accumulated on storage capacitor 42, 42" to run load 44. Load 44 can be multiple wireless sensing module 44, or an array of such modules, as shown in FIG. 11b. Monitoring device 70a/voltage sensitive switch 70b is in an undefined state, however, until at least 1.8 volts is available on its Vcc pin 7, which is connected to storage device 42, 42'. To avoid problems from this undefined state, MOSFET switch Q1. is provided to disconnect load 44 until voltage on storage device 42, 42' has reached 2.0 volts. R2 & R3 set the turn-on threshold $V_{th2}$ of voltage sensitive switch 70b to 6.3 volts. R1 provides hysteresis to comparator U1 giving it two thresholds. Voltage sensitive switch 70b now turns on when voltage on storage device 42, 42' reaches the higher threshold $V_{th1}$ of 6.3 volts and stays on until the voltage on storage device 42 discharges down to $V_{th2}$ the lower threshold of 2.9 volts. When storage device 42, 42' reaches its higher threshold of 6.3 volts there is enough charge available on storage device 42, 42' to power load 44 to operate for a brief period, for example, to transmit a burst of data. Load 44 may be a StrainLink transmitter or a data logging transceiver.

None of the charge provided to long term storage device 42', is supplied to wireless sensing module 44 until the voltage on long term storage device 42' reaches the higher threshold, $V_{th1}$, as shown in FIG. 6B. When voltage on long term storage device 42', C1 reaches $V_{th1}$, monitoring device 70 now turns on, as described herein above. Switch Q1 (transistor 72) has already turned on before $V_{th2}$ was reached, and charge is now transferred from long term storage device 42', C1 to operate wireless sensing module 44, as shown in FIGS. 6B and 6C. Voltage on long term storage device 42', C1 discharges to $V_{th2}$, about 2.9 volts at which point monitoring device 70 turns off.

If voltage to switch Q1 declines too far, switch Q1 will turn off, and this shuts off transmitter 44 until enough energy is accumulated in storage device 42' to send another burst of data.

Multiple wireless sensing modules 44 or other devices can be provided on a network, each powered as described herein with energy harvested from its environment. The multiple wireless sensing module 44 can transmit on different frequencies or a randomization timer can be provided to add a random amount of time after wake up to reduce probability of collisions during transmission. However, since the time for charging is likely to differ from one wireless sensing module 44 to another, a randomization timer may not be needed. Each wireless sensing module 44 will transmit an address as well as data. Transceivers can be provided to each wireless sensing module 44 to provide two way communication. Preferably, if a battery is used that is recharged from the environment, sufficient energy will be available so it can wake up periodically to determine if something is being transmitted to it. If not it can go back to sleep mode. If so, it can receive the transmission. All the members can be managed by a broadcast signal or each wireless sensing module 44 can be addressed and programmed individually.

Figure 7:
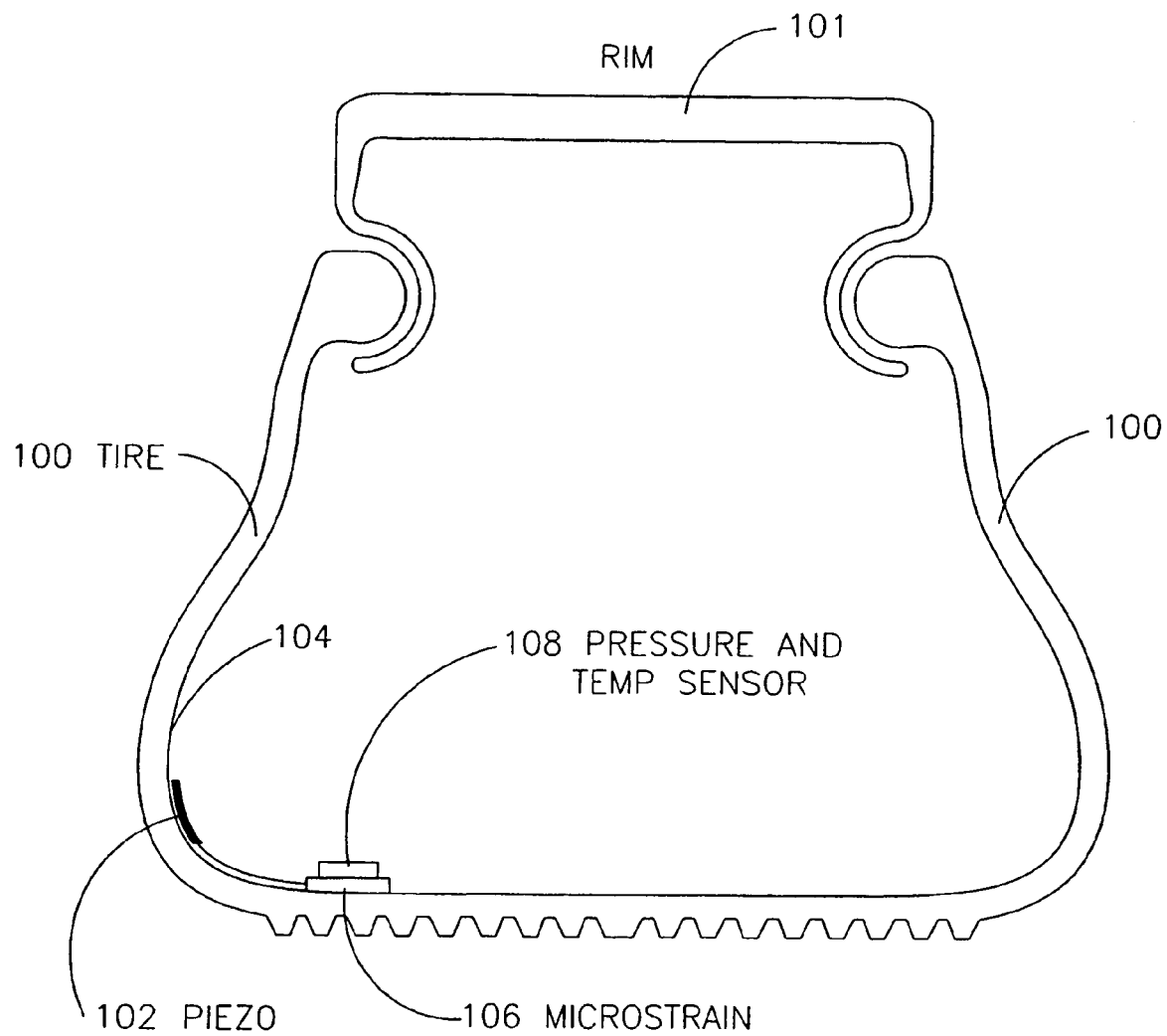
FIG. 7 is a cross sectional view of a tire having an energy harvesting device of the present invention to power transmitting pressure and temperature sense data.
Figure 8:
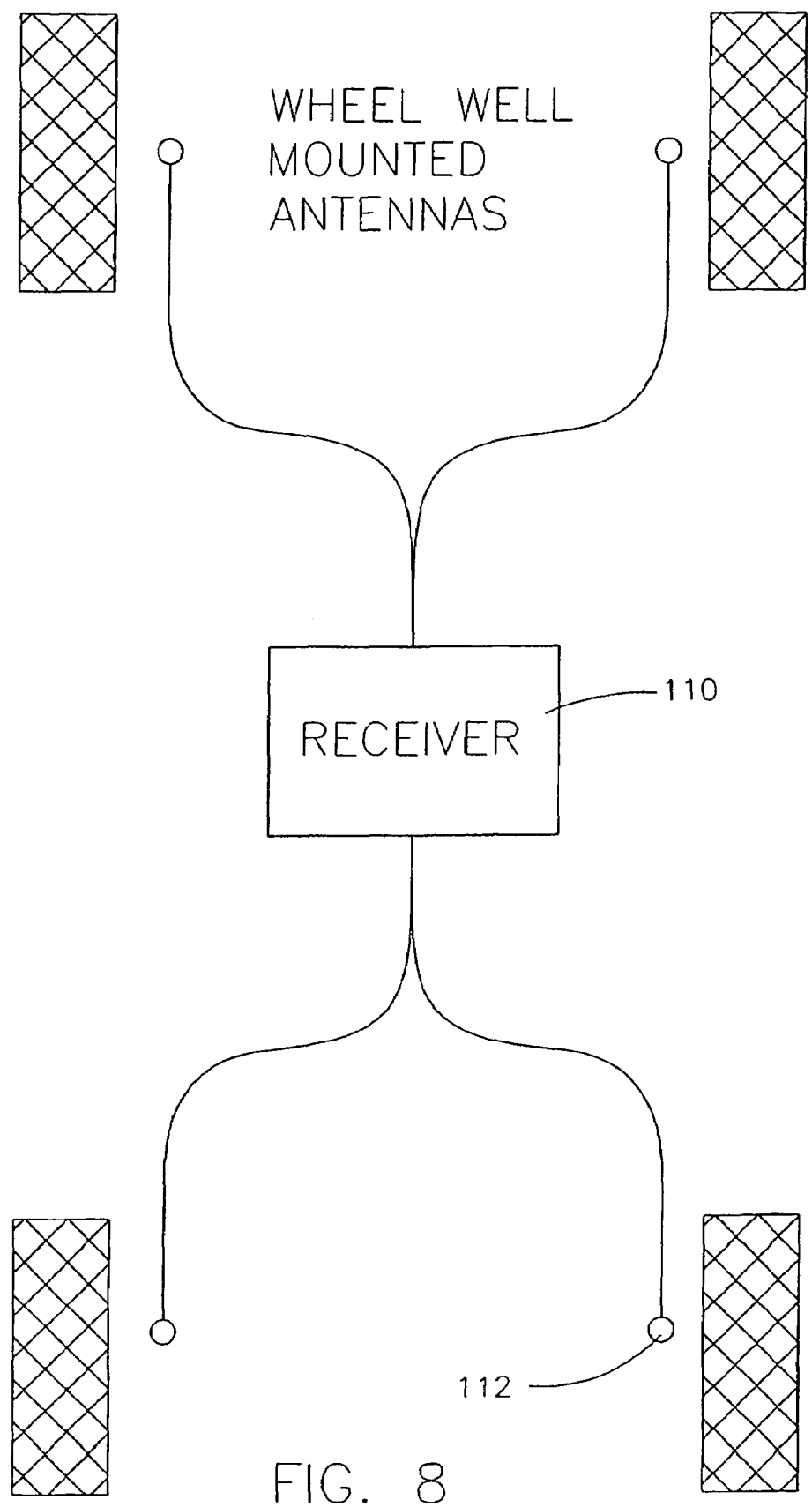
FIG. 8 is a schematic diagram showing a receiver mounted in a vehicle that receives signals indicating tire sensor data transmitted by each of the tires on the vehicle.

The present inventors have applied the energy harvesting system to design a device for embedding in a tire by a tire manufacturer for harvesting energy and for monitoring parameters, such as tire temperature and pressure on a vehicle and for transmitting the data, as shown in FIG. 7. The cross section of tire 100 shows the placement of PZT 102, or several such PZT elements, on or within interior sidewall 104 of tire 100 for gathering strain energy from flexing of tire 100 on rim 101 as the tire rotates. PZT 102 is connected to provide power to energy harvesting addressable wireless sensing node 106 for transmitting data from temperature and pressure sensors 108, such as SensorNor from Horten, Norway, to report this tire data. Energy harvesting addressable wireless sensing node 106 can be programmed to provide it with a 128 bit address. With such a large address there are enough combinations possible to allow every tire in the world to have a unique address. Thus, receiver 110 mounted in the vehicle can receive a signal indicating tire sensor data for each of the tires on the vehicle, as shown in FIG. 8. A display can provide the information to the operator. Alternatively, an alarm can signal when tire pressure or temperature is outside specified limits. Interference from other vehicles can be avoided by displaying only data from tires having known addresses.

Local antennas 112 can be provided in each wheel well (not shown) and the power output of energy harvesting addressable wireless sensing node 106 can be adjusted to provide reliable communications within the wheel well of the vehicle while avoiding interference with transmitters on adjacent vehicles.

Receiver 110, having antennas 112 positioned in each wheel well of the vehicle, can rapidly scan antennas 112 to determine the address and position of each tire on the vehicle. Because of the scanning of the antennas, even if tires are rotated, the display can indicate the location of a tire having a problem. Most modern receivers have the capability of accurately measuring received signal strength with fairly high resolution. In the case of inner and outer wheels in a single wheel well, these received signals can be qualified by received signal strength indication to distinguish the tires in the wheel well, even if they are rotated. Thus, the tire further from the antenna will have the weaker signal strength. In addition, the serial numbers of each tire would also be logged in the receiver flash memory to distinguish tires on the vehicle for feedback to a tire manufacturer.

One alternative to the tire position problem that does not require scanning or multiple antennas, is to have a technician sequentially scan a bar code on the tires at the time of tire installation on the vehicle, and communicate the tire position information to the automotive communications (CAN) bus or other communications bus within the vehicle, or even directly to the receiver. The position information is provided using a different protocol than the information tires are sending so this information can remain stored in the receiver while other data about the tire changes with each reading. In this way one receive antenna could receive data and an identification code from all tires on the vehicle, and the stored table linking identification and tire position can be used to communicate the position, temperature, and pressure of each tire. Interference from transmitters on adjacent vehicles is avoided since they would not have known identification codes.

The present inventors have also found ways to reduce power consumption as well as to provide power from energy harvesting. They recognized that power consumed by all of the system's components (sensor, conditioner, processor, data storage, and data transmission) must be compatible with the amount of energy harvested. Minimizing the power required to collect and transmit data correspondingly reduces the demand on the power source. Therefore, the present inventors recognized, minimizing power consumption is as important a goal as maximizing power generation.

The present inventors have developed and marketed sensors that require very little power. For example, they have previously reported on micro-miniature differential variable reluctance transducers (DVRT's) capable of completely passive (i.e., no power) peak strain detection. These sensors can be embedded in a material and will continuously monitor for the existence of a damaging strain state. By providing a hermetic seal the sensors can withstand harsh environmental conditions (moisture, salt, and vibration). The sensors can be reset remotely using shape memory alloys and (remotely applied) magnetic field energy, as described in a copending patent application Ser. No. 09/757,909, incorporated herein by reference. The present inventors have also recently developed totally passive strain accumulation sensors, which can be used to monitor fatigue. Furthermore, they have demonstrated novel radio frequency identification (RFID) circuits with the capability of interrogating these sensors in under 50 microseconds using less than 5 microamperes of current. Thus, although small amounts of energy may be available from energy harvesting, the energy so collected is enough to power sensors, electronics, and transmitters.

The present inventors have also developed wireless web enabled sensor network (WWSN) systems that require very little power. One strategy for minimizing power is demonstrated by the WWSN network architecture illustrated in FIG. 12. This is an ad hoc network that allows thousands of multichannel, microprocessor controlled, uniquely addressed sensing nodes TX to communicate to a central, Ethernet enabled receiver RX with extensible markup language (XML) data output format. A time division multiple access (TDMA) technique is used to control communications. TDMA allows saving power because the nodes can be in sleep mode most of the time. Individual nodes wake up at intervals determined by a randomization timer, and transmit bursts of data. By conserving power in this manner, a single lithium ion AA battery can be employed to report temperature from five thermocouples every 30 minutes for a period of five years. The XML data format has the advantage of allowing any user on the local area network (LAN) to view data using a standard Internet browser, such as Netscape or Internet Explorer. Furthermore, a standard 802.11b wireless local area network (WLAN) may be employed. at the receiver(s) end in order to boost range and to provide bi-directional communications and digital data bridging from multiple local sensing networks that may be distributed over a relatively large area (miles). Further information about a wireless sensor network system developed by the present inventors is in patent application docket number 115-004, incorporated herein by reference.

Another strategy for creating low power wireless sensor networks is demonstrated by MicroStrain's Data Logging Transceiver network as described in copending U.S. patent application Ser. No. 09/731,066, incorporated herein by reference. This system employs addressable sensing nodes which incorporate data logging capabilities, and a bi-directional RF transceiver communications links. A central host orchestrates sample triggering and high speed logging to each node or to all nodes. Data may be processed locally (such as frequency analysis) then uploaded when polled from the central host. By providing each sensor node with a 16 bit address, as many as 65,000 multichannel nodes may be hosted by a single computer. Since each node only transmits data when specifically requested, the power usage can be carefully managed by the central host.

For further energy savings, only limited data collected by sensors may be transmitted. For example, minimum, maximum and average data can be transmitted to reduce the amount of data transmitted and to thereby save energy. Standard deviation can also be locally calculated and transmitted, saving transmission time and energy.

For sensors detecting information where a band of frequencies is measured, such as measurements of a vibrating source with an accelerometer, a fast Fourier transform can be locally calculated and only the frequencies of vibration and the magnitude of vibration need be transmitted, rather than the entire waveform, to reduce the amount of information transmitted and to save energy.

The present inventors provided improved designs of each element of the entire measurement system, including the: vibrating/straining structure, piezo harvesting circuit, sensing circuit, microprocessor, on board memory, sensors, and RF data transmitter/transceiver to provide a system that operated with low power. The present inventors then built a prototype that both improved on the performance of energy harvesting devices and that reduced the energy consumption of each element of the measurement system, including the vibrating/straining structure, piezo harvesting circuit, sensing circuit, microprocessor, on board memory, sensors, and RF data transmitter/transceiver, as shown in FIGS. 3a, 3b, 4 and 5.

A demonstration energy harvesting circuit was built using a PZT fiber as its input, as shown in FIGS. 3a, 3b. The PZT device generates a voltage that is rectified by low forward drop diodes. This rectified voltage is used to charge a storage capacitor. The transfer is purely a function of the short circuit current of the piezoelectric structure, minus the loss of the rectifier stage, the self discharge of the storage capacitor, and any leakage current in the switch in its 'off' state. The behavior of this configuration is similar to charging a capacitor from a constant current source. The time required to charge the capacitor is inversely proportional to the amplitude of the strain or vibration applied to the PZT element at a given frequency of strain, and also proportional to the frequency of strain at a given amplitude. Once the voltage sensing switch detects that enough charge is stored on the capacitor, the load is connected to the storage capacitor. The load in this demonstration circuit is a MicroStrain Strainlink RF sensor niicrotransmitter. (MicroStrain, Inc. Williston, ) StrainLink is a multichannel, digital wireless transmitter system which allows direct sensor inputs from five pseudo differential (single ended) or three true differential channels. StrainLink features on-board memory, with user programmable digital filter, gain, and sample rates and with built-in error checking of pulse code modulated (PCM) data. Once programmed, these settings reside in the transmitter's non-volatile memory, which will retain data even if power is removed. The StrainLink transmitter is compatible with numerous sensor types including thermocouples, strain gauges, pressure sensors, magnetic field sensors and many others. The transmitter can transmit frequency shift keyed (FSK) digital sensor data w/checksum bytes as far as ⅓ mile on just 13 mA of transmit power supply current. During testing, the transmitter operated for approximately 250 mS on the power stored in the charged capacitor. This was ample time for the StrainLink to acquire data from a sensor and transmit multiple redundant data packets containing the sensed data.

Voltage sensing switch 70b was implemented using a nano-power comparator with a large amount of hysteresis. Some design difficulties arise when using an electronic device to perform such switching tasks. Voltage sensitive switch 70b itself needs to be powered from the source it is monitoring. When the available voltage is near zero the state of switch 70b is indeterminate. This can present a problem when the circuit is initially attempting to charge the capacitor from a completely discharged state. In the demonstration circuit as built, the switch defaults to 'on' until the supply voltage to its Vcc exceeds 0.7V, then it will turn off until the intended turn-on voltage level is reached. The transmitter draws constant current, except when the supply voltage is below the transmitter's regulator threshold. In this condition the current increases slightly from the normal operating current of 11 mA to about 15 mA at less than 1 volt. Because of this, and the fact that the switch is 'on' below approximately 0.7 volts, a silicon diode with equal to or greater than 0.7 V forward drop was added from the output of the switch to the transmitter power pin. This allows the storage capacitor voltage to charge to the point where the switch is active before the transmitter starts drawing current. The settings for voltage trip points were adjusted to 6.3V 'on' and 2.9V 'off'.

In practice, the voltage sensing switch is still falsely 'on' at supply voltages of up to 1 volt, at which point the diode is already conducting power into the load. Drawing current from the storage capacitor at this low voltage slows the charging of the capacitor. This creates a problematic "turn-on" zone where the capacitor is being drained at the same time it is being charged. This makes it difficult for the system to initially charge itself enough to begin operating properly. If enough strain energy is applied to the PZT element during initial system startup, then this turn-on zone is exceeded, and the system works properly.

The present inventors recognized that switching the positive rail e.g. a "high-side switch," inherently requires some supply voltage to be present in order to properly turn the load "off." This is not the case with a "low-side switch," or one in which the minus lead is switched to DC ground. FIGS. 3a, 3b, 11a, 11b illustrate an improvement to the switch that will eliminate the turn-on zone problem. It employs both the existing high side switch implemented with power comparator V1, LTC 150, and the addition of a low side switch in the DC return path of the power source. The low side switch is implemented with an N channel enhancement mode MOSFET, such as first switch Q1, 72 that has a gate turn-on threshold higher than the minimum operating voltage of the high side switch. This combination eliminates the disadvantages of the high side switch and the difficulties with implementing the appropriate switching function using only low side switch components.

High side voltage sensing switch V1 may falsely turn on when storage capacitor 42' is charged to between 0.7 and 1.0 volts. No current will flow, however, until the supply voltage exceeds the Vgs voltage of the gate of MOSFET Q1, 72. The Vgs voltage is typically greater than 1.5 volts even with so-called logic level MOSFETS that are optimized for full saturation at logic level (5 volt) gate to source voltage. Once the charge on capacitor 42' has exceeded Vgs, the MOSFET will allow current to pass, but by that point, the voltage sensing circuit will have sufficient supply power to function properly. These changes allow energy harvesting circuit 18', 18" to efficiently begin charging itself even when it starts from a completely discharged state.

Efficiency of the energy storage element is an important factor in implementing efficient designs because the energy may need to be stored for significant time periods before it is used. In the demonstration energy harvesting system, an aluminum electrolytic capacitor was utilized as the storage element. This is not an ideal choice since its leakage loss is relatively high. In fact, it can be as much as ten times higher than that of the voltage sensing switch used to monitor the capacitor voltage. To minimize this problem, alternative capacitor technologies, such as tantalum electrolytic and ceramic, can be used.

No matter what capacitor technology is used, charge leakage is likely to be a limiting factor in applications where long term storage of charge is necessary. Batteries, can be used for long term energy storage device 42, 42', and have advantage of essential ly zero charge leakage (<1% energy loss per year). Thin film batteries, such as those provided by Infinite Power Solutions, Littleton, CO, offer advantage of being able to be charged and discharged in excess of 100,000 times. In addition, batteiy chemistry allows for a battery cell to be continuously charged when power is available, as supplied by the PZT. The battery cells have high enough peak energy delivery capability (10 mA pulsed power) to aliow for short bursts of RF communications.

Reduced power consumption is inherently beneficial to the performance of systems using harvested energy. A significant reduction in power consumption can be realized through the use of embedded software in microcontroller 48 that controls the power consumed by the sensors, signal conditioning, processing, and transmission components of the energy harvesting wireless sensing systems (FIG. 5). By adjusting the time these devices are on, for example, power consumed can be reduced. In addition embedded processor 48 can be programmed to process and store sensed information rather than immediately transmit, and thereby reduce the frequency of data transmission. Finally the power levels used for RF communications can be reduced by bringing a receiver closer to the sensor nodes. This can be accomplished by providing multiple receivers for a sensor network, by bring an operator with a receiver closer, or by providing a mobile robot that approaches sensors and reads their data, as more fully described in copending application Ser. No. 60/362,432, filed Mar. 7, 2002 incorporated herein by reference.

The most direct strategy to reduce the power consumed by the sensors and signal conditioners is to use sensors that do not require power, such as thermocouples, piezoelectric strain gauges, and piezoelectric accelerometers. For thermocouples, cold junction compensation can be provided with a micropower solid state temperature sensor (National Semiconductor, Santa Clara, Calif.) that typically consumes 20 microamps current at 3 volts DC, for a continuous power consumption of only 0.06 milliwatts.

A second strategy is to employ sensors that do not need to transmit data frequently, such as temperature and humidity sensors. There are several very low power humidity sensors, for example from Honeywell that can be employed along with thermocouples or solid state temperature sensors to provide periodic data updates. For these types of measurements, the reading changes slowly, so energy can be conserved by transmitting the data infrequently.

A third strategy to minimize the power consumed by sensors 52 is to pulse the power to sensors 52 and to time the reading of data from A/D converter 50 appropriately. With the sensor on only for a brief period of time to achieve a stable reading and to obtain that reading for storage or transmission, much energy can be saved. Microstrain has successfully used this technique for powering and gathering data from strain gauges used in medical implants. The current, and therefore the power, savings that can be realized are significant. For example, a 350 ohm strain gauge bridge excited with 3 volts DC will consume approximately 8.6 milliamps. If powered continually, this represents a power drain of 25 milliwatts. By only providing the excitation voltage at periodic intervals and performing digital data conversion under microprocessor control, we have been able to reduce the sensor excitation time to 200 microseconds. For applications where a strain gauge reading is required every 100 milliseconds (10 Hz), the effective power drain is reduced by a factor of 500, (from 25 to only 0.05 milliwatts).

Power reductions in the signal conditioning are also realized by using highly integrated circuits (IC), such as the AD7714 by Analog Devices (Norwood, Mass.), that use very low power and combine a programmable gain instrumentation amplifier (110 dB CMRR), multiplexer, and 22 bit sigma-delta analog to digital converter. The current consumed by the AD7714 is 200 microamps at 3 volts DC, or 0.6 milliwatts. The AD7714 can be programmed to accept 3 full differential or five single ended sensor inputs. We have successfully employed this IC for use with foil and piezoresistive strain gauges, thermocouples, temperature sensors, torque sensors, and load cells. With a rectifier, a differential amplifier and periodic excitation we have successfully used these ICs with inductive displacement sensors.

The power consumed by the embedded processor can be reduced by using low power embedded microcontrollers, such as the PIC 16 series from MicroChip Technologies (Chandler, Ariz.). Such embedded processors include integrated instrumentation amplifiers to facilitate sensor conditioning, and integrated radio frequency (RF) oscillators to facilitate wireless communications. By including more capability on the processor, component count and system complexity are reduced, and there is a reduction in power consumed. Further reductions in power consumption are realized by placing the processor in "sleep mode" while the energy harvesting circuit is storing energy in its capacitor bank or battery. The processor (and its integrated amplifier/RF stage) does not come out of sleep mode until the energy harvesting circuit detects that the stored charge is adequate for the programmed task, such as reading a sensor. This prevents the measurement system and processor from loading the energy harvesting circuit and allows storage of energy to proceed most efficiently.

Further reductions in power consumption may be realized by using lower clock rates for the embedded processor. For example our existing Strainlink digital wireless sensor transmitter product is normally run at a clock rate of 4 MHz, and it consumes 600 microamps at 3 volts DC (1.8 milliwatts). For temperature measurement applications (or any other application requiring relatively infrequent data samples), we can reduce the processor's clock rate to 100 KHz, allowing a more than 20 fold power reduction to 28 microamps at 3 volts DC (0.084 milliwatts). For many health monitoring applications, we can improve performance by simply slowing down the system clock.

The energy required to power sensors, acquire data, and process/store these data is much lower than the energy required to wirelessly transmit these data. In the preceding discussion, we have shown that thermocouples (0 milliwatts) with cold junction compensation (0.06 milliwatts) could be combined with a smart microcontroller (0.084 milliwatts) and a very low power, highly integrated signal conditioner (0.6 milliwatts) to provide continuous thermocouple readings with a power drain of 0.744 milliwatts. This is in sharp contrast to the RF communications section of the electronics, which may require over 10 milliamps at 3 volts DC for a power drain of 30 milliwatts in order to provide adequate wireless range and good margin in electrically noisy environments.

By programming the processor to acquire and log sensed data and to compare these data to programmable threshold levels the frequency of RE transmission can be reduced to save power. If the sensed data exceeds or falls below the acceptable operating temperature ranges, then the processor transmits its data, along with its address byte. A randomization tuner is be used to insure that if multiple transmitters are transmitting their data (or alarm status) simultaneously, the probability of RE collisions is statistically small, as described in a paper entitled "Scalable Wireless Web Sensor Networks." SPIE Smart Structures and Materials, March, 2002, by Townsend et al. In the event that threshold levels are not crossed, stored summary data, such as mean, maximum, minimum, and standard deviation, are periodically transmitted over time intervals, such as hourly or daily. Transmission of processed data, such as these trends, and periodic transmission of this data saves more energy.

The processors may also be programmed to acquire bursts of data from a vibrating structure using an accelerometer. These data may be processed using average fast fourier transform (FFT) and power spectral density (PSD) analyses. The processed data would allow the RF link to transmit only the fundamental vibration frequencies, which would greatly reduce the amount of data that is transmitted and thereby greatly reduce the "on-time of the RF link.

To further reduce power consumed by the energy harvesting sensing nodes, we could reduce the RF communications power levels at the expense of range. For some applications, it may be possible for Navy maintenance personnel to approach an area where shipboard monitoring nodes have been placed. The energy harvesting monitoring nodes may also include RF transceivers, which would provide for bi-directional communications. Instead of only periodically transmitting sensed data, these nodes are programmed to periodically activate their integral receiver to detect the presence of maintenance personnel over the wireless link. A handheld transceiver carried by maintenance workers would query various nodes on the network and collect their data into the handheld device. This would greatly reduce the need for long range wireless data communications, and therefore would allow for reduced RF power levels at the remote energy harvesting sensor nodes. Microstrain has developed a high speed data logging transceiver product that could be adapted to this purpose.

The vibrational energy harvesting unit is illustrated schematically in FIG. 1a-1d. It consists of circuit board 25 that is rigidly fixed to some vibrating component, such as vibrating machine 19. Leaf spring 22 is mounted to this base in a cantilever configuration. Proof mass 24 is suspended at the free end of the leaf spring, and this can be adjusted to more nearly provide a resonance frequency close the vibration frequency. One or more PZT elements 20 are bonded to the surfaces of leaf-spring 22 such that when spring 22 deflects, PZT 20 will undergo tensile/compressive strains and therefore be stimulated to generate an electrical output suitable for input into energy harvesting circuit 18', 18". To maximize the output of PZT 20, leaf spring 22 is preferably constructed using a "constant strain" profile, as shown in FIG. 1c, such that the strains experienced by the PZT elements are uniform along their length. To provide a constant strain profile, leaf spring flexure element 22 can have a taper, as shown in FIG. 1c. Enclosure 26 surrounds the device to keep contaminants out, and to make the device convenient to handle and damage resistant.

Enclosure 26 measures approximately 50×50×150 mm and leaf spring flexure element 22 has adjustable proof mass 24 of between 100 and 500 grams. Tuning the unit will be accomplished by adjusting the size of proof mass 24, which can be washers, as shown in FIG. 1c. The energy harvester is capable of generating sufficient energy to intermittently power a transmitter and several low power sensors, as shown in FIGS. 3a, 3b, 11a, 11b.

As described herein above, a rotating shaft can also be a source of energy for harvesting. In fact, one of the most important applications for wireless sensors is the measurement of torque on rotating shafts. Ironically, this application has been neglected by researchers working in the area of energy harvesting. Commercially available torque measurement systems for use on rotating shafts currently use slip rings, battery powered telemetry, or external alternating current (AC) magnetic field powering. But slip rings are costly and unreliable. Batteries eventually die and must be replaced. External AC powering systems must be powered themselves, and require close physical proximity to operate reliably. External powering systems can also add significant cost, complexity, and size. The limitations of existing systems have prevented wide acceptance of shaft monitoring systems, but there are literally hundreds of millions of rotating shafts on cars, trucks, machines, pumps, etc. that could benefit from being monitored.

The present inventors recognized that rotating shafts may not always spin at constant rates, and may even come to a stop, therefore the amount of energy supplied by the rotating shaft may vary substantially. Thus, they recognized that the energy harvesting system should be capable of storing energy harvested from the rotation over time. This stored energy insures that data may be delivered even when the shaft is rotating slowly or there is otherwise insufficient ambient mechanical energy to power the sensing and transmission system continually.

The present inventors also recognized that the advent of tiny, low cost, battery-less digital wireless communications, especially when combined with smart sensors and internet data delivery, would allow extremely efficient condition based maintenance (CBM) of these rotating shaft systems. They recognized that providing energy storage and data storage would allow data collection and communications when the shaft is not rotating or when insufficient energy has been stored to allow immediate transmission. Energy storage can be provided by a capacitor, a rechargeable battery, or another energy storage device. They recognized that the improvements provided herein would allow defects in lubrication, bearings, etc. to be recognized before failure occurred, allowing considerable savings to be realized through prevention of equipment downtime caused by sudden equipment failures.

The present inventors created a new class of energy harvesting wireless sensor systems which they termed "Spin Powered", and which they designed for use on rotating shafts. Energy generated by the motion of the spinning shaft is harvested, and this energy is stored over time. Once enough power is available or enough energy has been stored to power the transmitter, the system will transmit data collected by its sensors to provide a direct measure of shaft torque, rate of rotation, and mechanical power driving the shaft. A microprocessor and a micro-power digital RF link to a remote receiver may be used for controlling the transmission.

Figure 13:
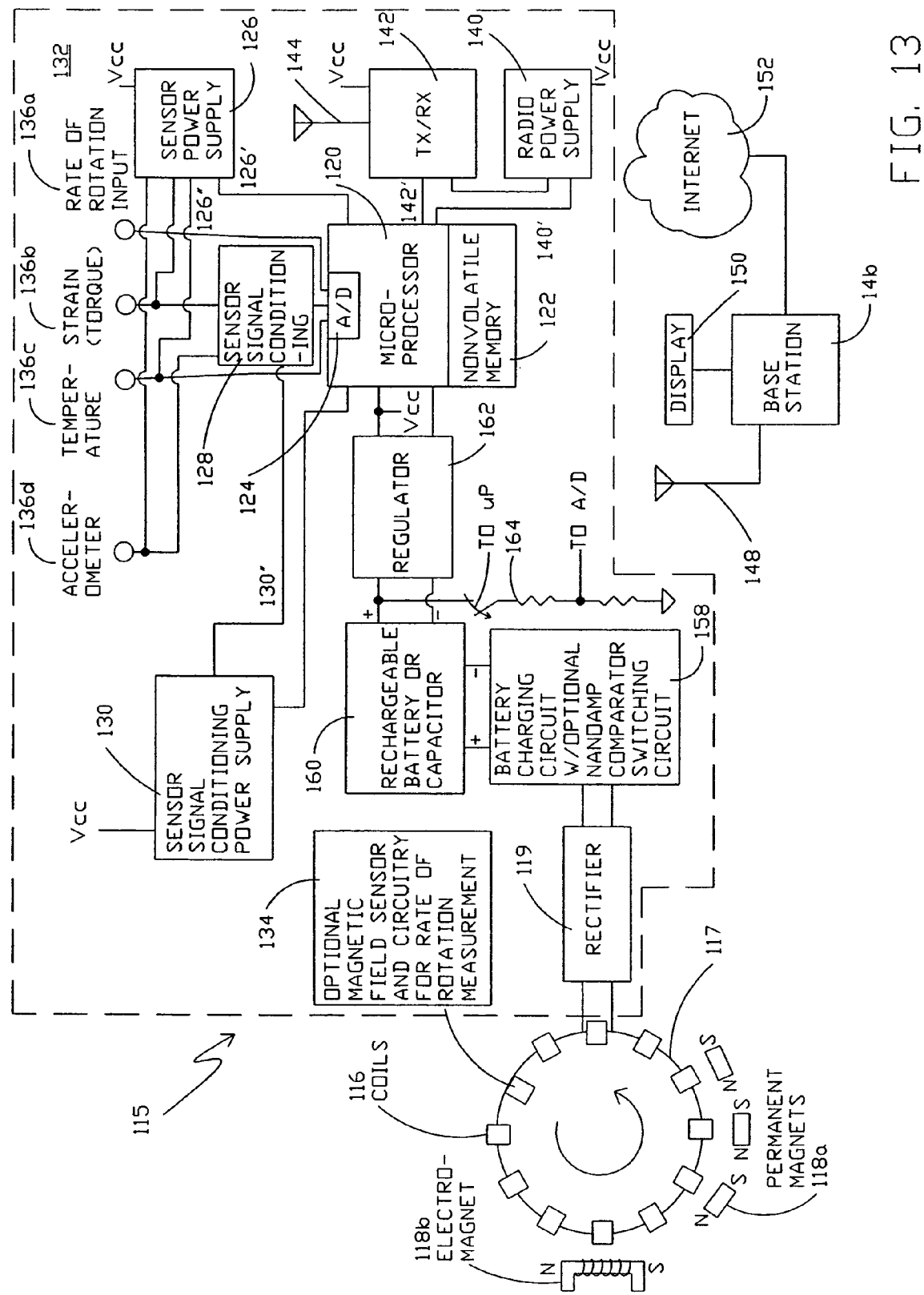
FIG. 13 is a block diagram of an shaft mounted energy harvesting system of the present invention.

Shaft mounted energy harvesting system 115 includes one or more coils 116 deployed on rotating shaft 117, as shown in FIG. 13. One or more stationary permanent magnets 118*a* are placed on fixed supports adjacent rotating shaft 117. Preferably permanent magnet 118*a* is fabricated of a material such as AlNiCo, neodymium iron boron or another magnetic material. As shaft 117 spins, coils 116 mounted on shaft 117 spin as well. As each coil moves through the field produced by permanent magnet 118*a* that coil experiences a changing magnetic field. The changing field experienced by each coil induces an emf or an electrical pulse in that coil which can be converted to DC power using rectifiers 119, as shown in FIG. 13 and in more detail in FIG. 14. Spinning coils 116 on shaft 117, are shown in schematic fashion as inductors (L) in FIG. 14. Rectifiers 119, such as semiconductor diodes or Schottky barrier diodes, are used to rectify the current pulses induced in coils 116. Alternatively, a full wave rectifier could be used, such as rectifier 40, shown in FIG. 11*a*.

Thus, pulses of electricity are generated in coils 116 mounted on shaft 117 from the motion of shaft 117 and coils 116 through a stationary magnetic field, and this energy can then be used to power components mounted on rotating shaft 117 without any electrical connection to shaft 117. In addition to generating energy from magnetic induction the pulses of electricity generated in one of the coils 116' can be used for measuring angular speed and rotations per minute, or RPM, as further described herein below. Other than coils, devices such as Weigand wire elements, could be used to generate the emf in place of coils 116.

Figure 14:
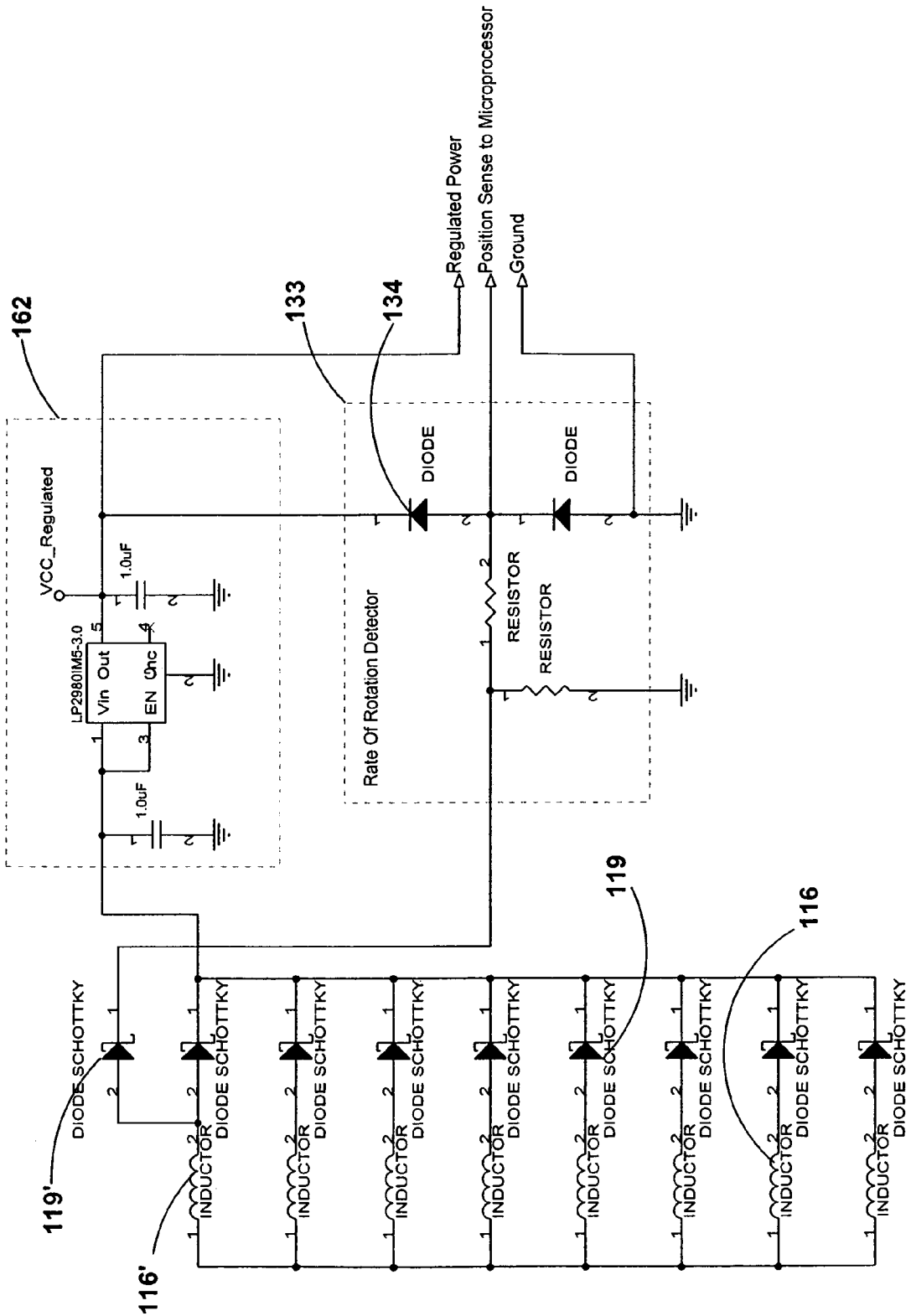
FIG. 14 is a schematic diagram of a portion of the system illustrated in FIG. 13 and showing the arrangement of rectifiers, a rate of rotation detector, and a voltage regulator.
Figure 15:
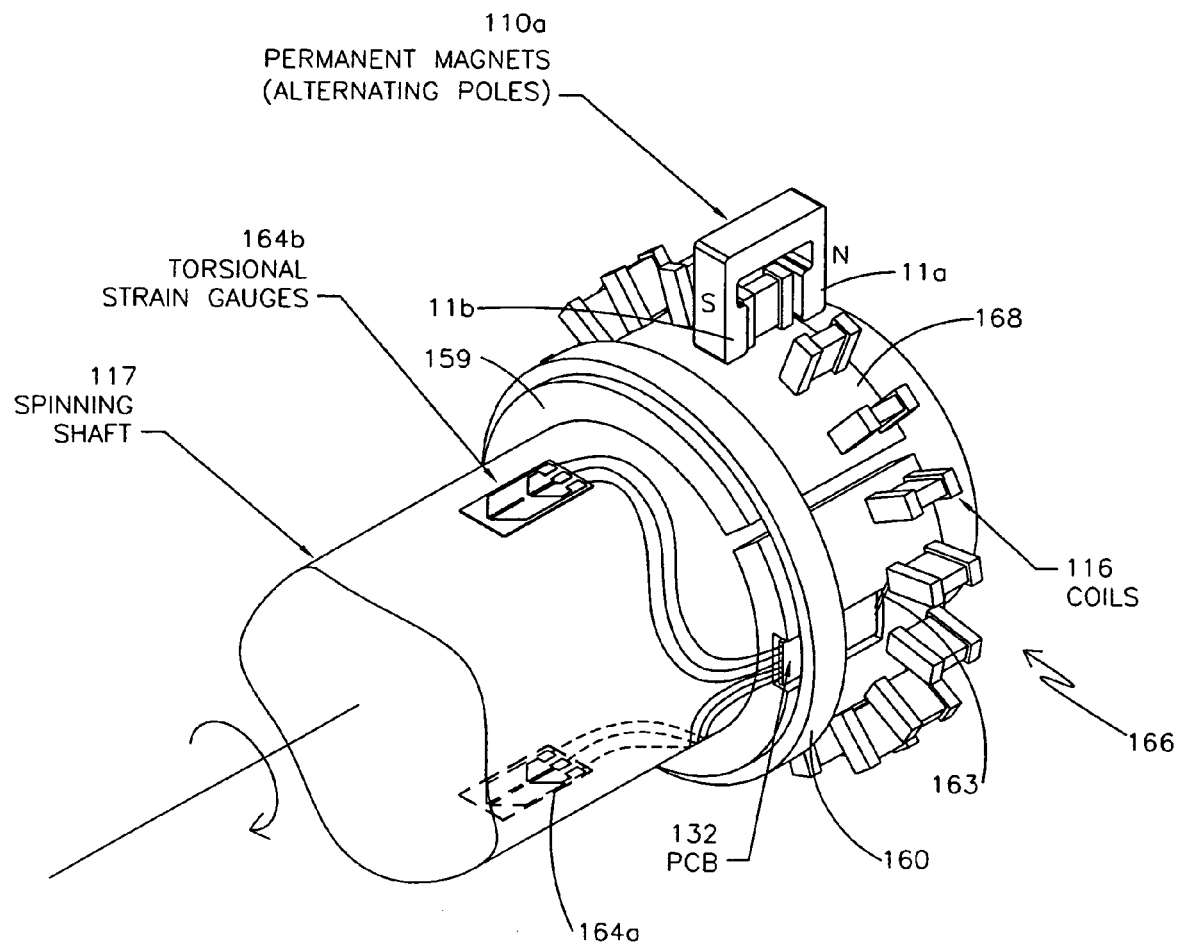
FIG. 15 is a three dimensional view of a shaft mounted energy harvesting system of the present invention showing the system for harvesting energy from movement of coils on the shaft through a stationary magnetic field and placement of strain sensors on the shaft.

Stationary permanent magnet 118*a* can be a horseshoe magnet which concentrates magnetic flux lines through spinning coils 116, as shown in FIG. 14. Flux concentrating pole pieces with a straight permanent magnet could also be used. This concentration of flux enhances the efficiency of shaft mounted power generating and energy harvesting system 115. In order to further enhance the amount of power generated, additional stationary permanent magnets 118*a* could be used or more coils 116 could be arranged around the periphery of spinning shaft 117, as shown in FIG. 15. It is also possible to substitute stationary electromagnet 118*b* for permanent magnet 118*a*, as shown in FIG. 13. However, stationary electromagnet 118*b* would require a power source, whereas stationary permanent magnet 118*a* does not require a connection to a power source in order to provide a DC magnetic field. Magnetic coupling between magnet 118*a* and coils 116 could be improved by reducing the gap there between and by making the lateral dimensions of coil 116 more closely match the lateral dimensions of pole pieces of stationary permanent magnet 118*a*. Also polishing the faces of pole pieces 119 usually allows better magnetic coupling.

The present inventors improved energy harvesting circuitry for use with such a shaft mounted induction powering system. They mounted microcontroller or microprocessor 120, non-volatile memory 122, such as EEPROM, data conversion elements, such as A/D converter 124, sensor power supply 126, analog circuitry for analog sensor signal conditioning 128, and sensor signal conditioning power supply 130 on printed circuit board 132, as shown in FIG. 13.

They also provided connection to one diode 119' which is connected to input 136*a* to sensor signal conditioning circuitry 128 for detecting the angular rate of rotation of spinning shaft 117 on printed circuit board. Sensor signal conditioning circuitry 128 uses the current pulses generated by coil 116' as rectified in diode 119' to determine angular rate of rotation ω based on the time elapsed between pulses generated in this coil by revolution of shaft 117. A crystal (not shown) may be provided for use with microcontroller 120 for providing accurate time to microcontroller 120 for providing the time reference for performing this calculation. Alternatively, an on-board RC oscillator (not shown) can be used in microcontroller 120 to provide time. A crystal is generally more accurate since an RC oscillator may drift with time and temperature.

The signal at diode 119' occurs once per revolution of shaft 117 as coil 116' to which diode 119' is connected passes permanent magnet 118*a*, as shown in FIGS. 13 and 14. Rate of rotation detector 133 includes diodes 134 and resistors 135 which are configured to convert pulses from diode 119' into logic levels at input 136*a* that microprocessor 120 can include with its internal time measurement to calculate rpm.

Printed circuit board 132 also includes radio power supply 140 and RF transmitter or transceiver 142, both connected to microprocessor 120, as shown in FIG. 13. RF transmitter or transceiver 142 transmits data it receives from microprocessor 120 through antenna 144. Base station 146 receives transmissions from RF transmitter or transceiver 142 through antenna 148 and can display data on display 150 or transmit data to other receivers through the internet represented by cloud 152, as also shown in FIG. 13.

Printed circuit board 132 also includes additional electronic components used to facilitate harvesting energy from the electrical pulses provided by rotating shaft 117 and coils 116 moving in the stationary magnetic field of stationary permanent magnet 118a. Rectifiers 119 receiving signals from each coil 116 are ganged together, and their output may go to battery charging circuit 158 and energy storage device 160 to recharge energy storage device 160, as shown in FIG. 13.

Energy storage device 160 may be a very low leakage, high capacity capacitor, or "super capacitor," such as those provided by the Panasonic's Gold Gap series, Matshushita, Corp. Japan. Alternatively, rechargeable electrochemical batteries capable of a very high number of recharging cycles (Infinite Power Solutions, Golden, Colo.) may be deployed. Energy storage device 160 may be a single or multi-celled lithium-ion battery or an electrochemical battery. Lithium-ion charge controller, such as the BQ2400X available from Texas Instruments, properly charges a lithium-ion battery and protects the battery from such improper input as overcharging, and overheating. Rechargeable batteries provide a reliable long term storage means, which is especially important in those applications where system start-up torques need to be recorded or transmitted since during startup shaft 117 may not be providing enough energy for recording or transmission.

Battery charging circuit 158 can optionally include a nano-amp comparator switching circuit, similar to that provided in the piezoelectric energy harvesting system illustrated in FIG. 11b. A nano-amp voltage comparator monitors output voltage of rectifier 119 to ensure that adequate charge is available to store on charge storage device 160. If the nano-amp comparitor determines that a high enough voltage is being generated then it switches that voltage into energy storage device 160.

The charge level provided on energy storage device 160 provides an unregulated output level which is then regulated to a voltage level Vcc in regulator 162, as shown in FIGS. 13 and 14. This regulated Vcc is provided to the various power supplies on PC board 132, including a power supply for microprocessor 120 and power supplies 126, 130, 140 for sensors, signal conditioning, and RF transmission. Regulator 162, may include an LP series regulator from National Semiconductor Corporation, Santa Clara Calif., part number LP2980IM5-3.0.

Battery charging circuit 158 insures that the battery can be trickle charged when low energy is being harvested or charged more rapidly in the event that higher levels of energy are available. As there are many types of batteries available, an appropriate commercially available charge controller specific to the battery chosen is desirable to control the charge process.

For a spinning shaft 117 generating a large amount of electrical energy a small energy storage device 160, such as a capacitor or a small rechargeable battery, is adequate because it can be kept fully charged even with all devices continually powered by processor 120. However, for a spinning shaft 117 that is spinning slowly or intermittently, or is otherwise generating little electrical energy, preferably a larger battery or a larger capacitor is used to store energy and intermittently run power consuming electronics, such as microprocessor 120 and the sensing, data logging, and transmission elements shown in FIG. 13.

Sensors connected to inputs,136a, 136b, 136c include rate of rotation sensors strain gauges, temperature sensors, and other sensors, such as accelerometers, and these sensors may be located on printed circuit board 132 or they may be directly mounted on shaft 117, as shown in FIG. 15, and connected to PC board 132 with wires 163.

The present inventors found that they could epoxy torsional strain gauges 164a, 164b to shaft 117, as shown in FIG. 15, for measuring torsional strain in shaft 117. They could then convert this measured strain to torque of shaft 117 using the equation below, where T is the calculated torque, $\epsilon$ is the torsional strain as measured by torsional strain gauge 136b, Do is the outer diameter of shaft 117, Di is the inner diameter of shaft 117, E is the modulus of elasticity of the material of which shaft 117 is fabricated, and v is the Poisson Ratio Poisson ratio is material property having to do with width v. stretch of that material.

$$\text{Torque } (T) = \frac{\varepsilon * \pi (Do^4 - Di^4) E}{16 D_o (1 + v)} \quad (1)$$

The present inventors executed the calculation of equation (1) with firmware embedded in microcontroller 120 on printed circuit board 132 that could perform the arithmetic functions of equation (1), and they were able to compute the torque for shaft 117 from pulses provided by set of coils 116 mounted on shaft 117.

Using the same calculating firmware they were also able to compute power provided by spinning shaft 117, which was calculated by multiplying the calculated torque T by the angular rate $\omega$ derived from the pulses provided by coil 116', diode 119', and rate of rotation detector 135.

$$P = \omega T \quad (2)$$

where P is the mechanical power provided by shaft 117 and $\omega$ is the angular rate of rotation expressed in radians/sec.

Note that the angular rate is actually measured directly from pulses provided by coil 116' and diode 119'. Thus coil 116' and stationary permanent magnets 118a are used both for power generation and for RPM or angular rate sensing to compute mechanical power of shaft 117. The ability to monitor RPM, with coil 116' and diode 119', (or with Wiegand effect devices), along with the ability to monitor torque of shaft 117 from tortional strain in shaft 117, as described herein above (or with commercially available torque sensors connected to input 136b) provides the needed data for the microprocessor 120 to automatically compute the instantaneous mechanical power produced by the system that is driving the shaft.

In the preferred embodiment, full torsional strain gauge bridge 164a, 164b is deployed (45 degree chevron patterns) is bonded on opposite sides of the shaft, as shown in FIG. 15, to provide a full bridge with maximum sensitivity to torsional strain while canceling bending and axial strains. It is well known how to install a chevron pattern on a shaft to cancel bending and axial strains.

Preferably coils 116 and printed circuit board 132 that encompass sensing package 166 are mounted on split cylindrical ring 168, as shown in FIG. 15 so shaft 117 does not need to be removed or altered for installation of sensing package 158. Split ring 168 includes splt clamps (not shown) to attach split cylindrical ring 168 on shaft 117. Strain sensing elements 164a, 164b are preferably glued to shaft 117, and wiring 170 from strain sensing elements 164a, 164b are connected to printed circuit board 132.

Alternatively a commercially available torque sensing device (not shown) can be clamped to shaft 117 or a torque transducer (not shown) can be put in line with shaft 117, but this requires interrupting shaft 117. The present system for harvesting energy from shaft rotation can also be used for powering devices such as a torque sensing device or a torque transducer, commercially available from Micromeasurements, Inc., Raleigh, N.C.

Torsional strain sample rate can be in the range from 0-1000 Hz is typical and it can range to 40 kHz or higher. Torsional strain sample duration of 25 microseconds is typical, depending on the speed of A/D conversion, leaving a significant amount of time between samples taken at 1000 Hz or lower. During this time between samples the present inventors found that they could program microprocessor 120 to go into sleep mode and to turn power to other components off, substantially reducing the amount of power consumed by system 115. They also found that they could program sample rate in microprocessor 120 and that they could program microprocessor to automatically adjust sample rate depending on available stored energy in energy storage device 160 and the rate energy is being accumulated or depleted on that device.

RF transmitter portion of transceiver 142 may operate at 916 MHz, narrowband FSK, and may have a software programmable carrier frequency and RF power level. In other countries other appropriate frequencies can be used. Alternatively direct sequence spread spectrum can be used running at 2.4 Ghz, an emerging standard for low power wireless sensors referred to as zigbee. Alternatively, for periodic transmission 418 Mhz can be used in the US.

RF receiver portion of transceiver 142 may operate at 400-930 MHz, narrowband FSK, and have serial RS-232, USB, and high level 0-5 volts analog outputs. Other possibilities, as described for the RF transmitter can also be used.

Sensors for measuring other parameters of shaft 117, such as bending strains, or axial tensile/compressive strains can also be included. A three channel version of SG-Link can be used with judicious placement of strain gauges to make these other measurements. Rechargeable-battery powered wireless strain gauge systems, commercially available under the trade names V-Link by MicroStrain, Inc. (Williston, Vt., USA), could also be used. V-Link has four differential sensing channels, a temperature sensor, and 3 additional analog inputs, for a total of 8 sensing channels.

Other sensors can also be used, such as accelerometer 136d, to measure other parameters, such as vibration of a shaft that could be produced by out of balance, bearing failure, or suspension failure since problems in devices connected to the shaft could be transmitted back to the shaft and picked up by accelerometers or other sensors. Since acceleration increases with angular rate accelerometer 136d can also be used to detect angular rate and rpm without need for the magnet, coil, and diode. Correction for gravity, if needed, can be included in firmware. Alternatively, accelerometer 136d can give additional information about the health of bearings from vibration it measures.

Data from diode 119' and strain sensor 154b connected to inputs 136a, 136b are conditioned in signal conditioning 128 and then received by A/D converter 124 and microprocessor 120, as shown in FIG. 13.

Sensor signal conditioning 128 includes sensor amplification, automatic shunt calibration, hardware/software programmable sensor offset adjustment, and hardware/sofiware programmable sensor gains, as described herein above and in commonly assigned U.S. Pat. No. 6,529,127 and in the 115-005 application, both of which are incorporated herein by reference, and in user manuals available from Microstrain, Inc. Bridge completion resistors may also be included in signal conditioning 128 for those applications where the sensor does not use a full Wheatstone bridge, as also shown in these user manuals, to provide a full Wheatstone bridge to the signal conditioning. Sensor amplification, automatic shunt calibration, hardware/software programmable sensor ofThet adjustment, and hardware/software programmable sensor gains are currently available in rechargeable-battery powered wireless strain gauge systems, commercially available under the trade names V-Link and SG-Link by MicroStrain, Inc. (Williston, Vt., USA). Devices such as V-Link or SG-Link can be used along with the energy harvesting power source provided herein to provide these features.

For strain sensing applications, the ability to wirelessly program sensor offsets and gains has been an important feature of the signal conditioning, because strain gauges typically exhibit significant offset due to changes in resistance induced during installation. Furthermore, gain programmability is important because in many applications the full scale strain output is not known when the device is manufactured, and therefore the system gain may need to be adjusted after installation.

Figure 16:
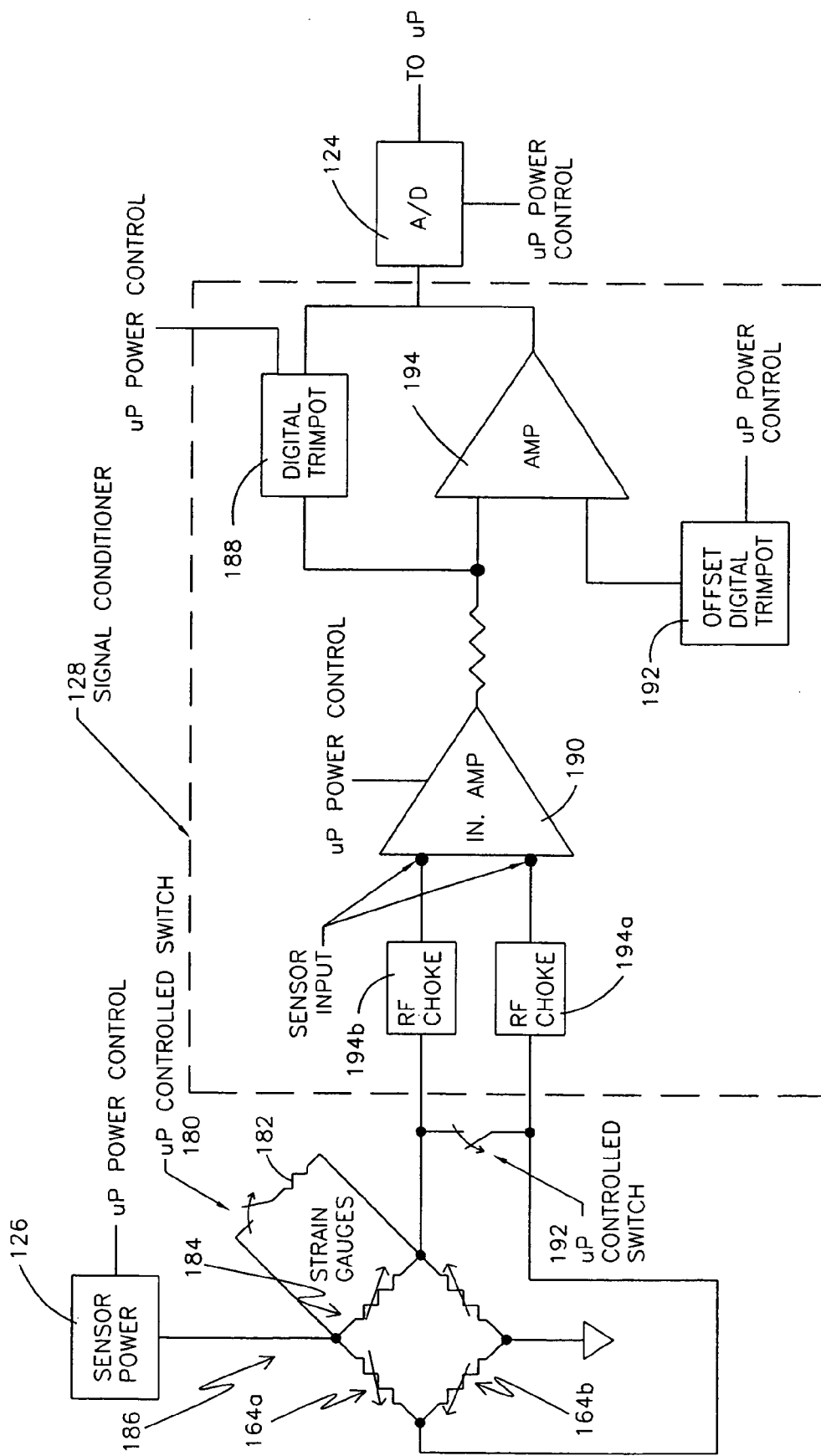
FIG. 16 is a block diagram of circuits used to adjust gain and offset of sensor conditioning.

The ability to monitor temperature simultaneously with strain allows system 115 to automatically compensate and correct for changing temperature on the offset and gains associated with the torque. A look up table or mathematical relationship describing how the offset and gains change with temperature determined in a calibration step is used to automatically make adjustments as temperature changes. The calibration step and generation of the look up table or mathematical relationship may be done in the factory. Alternatively, gain can be adjusted in the field with a shunt calibration, as shown in FIG. 16. Microprocessor controlled switch 180 is closed to switch known resistance 182 in parallel with one arm 184 of Wheatstone bridge 186 that includes strain sensing elements 164a, 164b. Switching in known resistance 182 provides a known resistance shift into arm 184 of Wheatstone bridge 186, which simulates a known sensor signal into bridge 186, and gain calibration can thereby be achieved by adjusting digital trimpot 188 to provide a desired full scale output when the shunt is applied.

Offset associated with the sensor signal conditioning 128 can also be automatically removed in the field by shorting inputs to instrumentation amplifier 190 with microprocessor controlled switch 192, as also shown in FIG. 16, to remove all strain sensing elements, such as Wheatstone bridge 186, from sensor signal conditioning circuit 128. Shorting microprocessor controlled switch 192 provides equal input signals to both inputs of instrumentation amplifier 190. Any non-zero output is the offset. Microprocessor 120 can then automatically adjust the offset voltage using offset programable digital potentiometer 192 to re-zero the offset so that the output of amplifier 194 as measured through AID converter 124 is now zero. An offset is provided to programable offset digial trimpot 192 to make this output zero. With equal amplitudes at both inputs of amplifier 194, its output should now be zero.

RF chokes 194a, 194b are provided at both inputs to instrumentation amplifier 190 to eliminate high frequency noise. Output of signal conditioner 128 goes to A/D converter 124 and then to microprocessor 120.

Management of power is particularly important for shafts that may spin slowly and generate less energy, for small diameter shafts or where space around the shaft is small so multiple stationary permanent magnets 118a cannot be deployed, or for systems that otherwise have to be miniaturized. As mentioned herein above, the present inventors improved efficiency of energy use by adjusting sampling rate for energy available, sleeping processor 120 between samplings, and shutting down power supplies 126, 130, 140 for sensors, sensor signal condition and RF transmission between samplings. In addition they provided for data storage on non-volatile memory 122 and provided for data reduction in microprocessor 120, thereby reducing the amount of transmission and duration of transmission required.

Sensors connected to sensor inputs 136a, 136b, 136c are connected to sensor signal conditioning circuit 128 which is powered by sensor signal conditioning power supply 130. For strain and torque sensing elements, sensor signal conditioning power supply 130 are preferably very low power voltage regulators, such as LP series regulators available from National Semiconductor Corporation, Santa Clara, Calif. Preferably power supply 130 is a voltage regulator with an enable pin and control line 130' from microprocessor 120 enables microprocessor 120 to provide a signal to turn on or turn off the voltage regulator. Preferably a number of other such control line regulators, such as power supplies 126 and 140 are provided on printed circuit board 132, as shown in FIG. 13. Control lines 126', 140' provided from microprocessor 120 control operation of these power supplies, such as sensor power supply 126 and radio communications power supply 140. This separate control over each power supply 126, 130, 140, allows microprocessor 120 to only turn on those power supplies and those elements that are needed for a required function, such as transmission, while leaving other power supplies and other elements off, therefore minimizing the instantaneous and average power consumed by system 115. This separate control is particularly useful when the amount of energy that can be harvested from spinning shaft 117 is low due to slow rotation of shaft 117. For example separate control over each of these power supplies allows microprocessor 120 to selectively turn on selected portions of the circuit to meet the needs of a given application without turning on other portions. Alternatively, separate control over the various power supplies also allows power consumption of shaft mounted energy harvesting system 115 to be determined based on the available energy from the spinning shaft energy harvesting portion of the system. For example sample rate can be adjusted by microprocessor 120 by adjusting time between signals enabling power supplies 126 and 130 proportional to RPM of shaft 117, as one example of such control.

Figure 17:
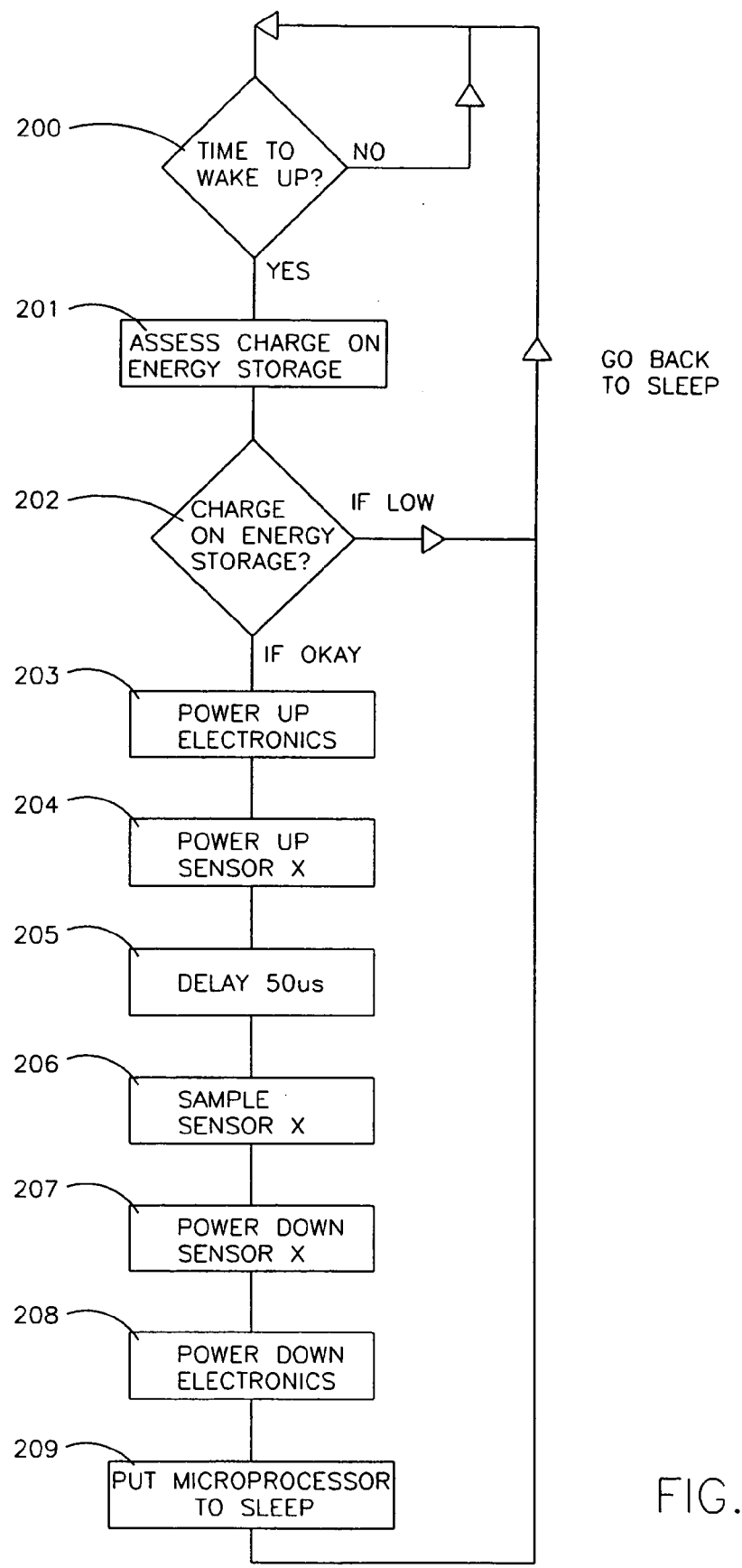
FIG. 17 is a flow chart representation of firmware running on the microprocessor.

Alternatively to controlling devices on spinning shaft 117 based on RPM of shaft 117, microprocessor 120 can also base control on charge level of energy storage device 160 or based on rate of depletion of charge from energy storage device 160. Rechargeable energy storage device 160 can be queried by microprocessor 120 with a voltage divider or a battery gas gauge indicator, as is well known in the art. By measuring charge state and then later measuring charge state again one can also determine if energy storage device 160 is depleting or charging and one can also determine the rate of depletion or charging. Based on this information processor 120 can adjust such things as the rate of sampling sensors, the length of time they are sampling each time, and how often to transmit data. Microprocessor 120 can be remotely programmed to change these parameters or it can automatically adjust itself, as shown in the flow chart in FIG. 17, depending on the state of charge and the rate of depletion of charge as well as depending on the requirements of the measurement application.

In the first step, microprocessor 120 determines whether it is time to wake itself up, as shown in step 200. If it is not time, microprocessor remains in sleep mode. Alternatively, microprocessor may awaken upon receiving a signal from a base station. In either case, upon awakening, microprocessor 120 assess charge on energy storage device 160, as shown in step 201, based on open circuit voltage or voltage across a voltage divider or another battery charge circuit. Alternatively it may use the speed of rotation of shaft 117. Based on this assessment, microprocessor decides whether charge on energy storage device 160 is sufficient, as shown in step 202. If not, microprocessor 120 goes back to sleep and awaits additional time or another signal. If charge is sufficient, micrprocessor 120 sends a signal to power up sensor electronics, such as strain sensor 164a, 164b, as shown in steps 203 and 204. Microprocessor includes a delay time of about 50 microseconds for it to fully stabilize after awakening from sleep mode, as shown in step 205 and then microprocessor sends a signal to the power supply that powers a sensor, as shown in step 206 which initiates sampling. In the next step, microprocessor turns off the signal to the power supply powering the sensor, as shown in step 207, sends signals powering down sensor electronics, as shown in step 208, and puts itself to sleep as shown in step 209 to await the next time to wake up.

Microprocessor 120 has control line 140' to RF communications power supply 140 and communication lines 142' to RF transmitter or transceiver 142 for transmitting data externally. Microprocessor 120 can thereby adjust the frequency of external transmission by adjusting time between signals enabling power supply 140 based on energy available. Similarly, microprocessor 120 may also have both control and communication lines (not shown) to nonvolatile memory 122 for data collection and data processing. To further reduce the consumption rate of power microprocessor 120 can similarly control other power using elements of system 115 by enabling and disabling power supplies to those elements, as described herein above. For example such control lines may be used to control the state of sensors connected to inputs 136a, 136b, 136c to permit minimizing the energy consumed by these sensors along with controlling sensor power supply 126 and controlling sensor signal conditioning power supply 130 to which they are connected.

With control over the various power supplies and sensors, during a time period when data from sensors is being sampled, microcontroller 120 can substantially reduce power consumption by turning power off to such devices as strain gauge 154b, strain gauge power supply 126, strain gauge signal conditioning power supply 130 and thereby to signal conditioning 128. In addition, between turn-on signals provided by microprocessor 120, microprocessor 120 goes into sleep mode. With all these devices powered off between signals from microprocessor 120, power consumption can be reduced by orders of magnitude. For example power to sensor, signal conditioner, and microprocessor may be off for 10 ms and on for 0.25 ms. Thus power is on only 2.5% of the time.

In sleep mode microprocessor 120 is not entirely turned off. At least the timer function of microprocessor 120 is still enabled, and the time is used in microprocessor 120 to determine when microprocessor 120 wakes up from sleep mode to provide turn-on signals to other components and to provide other scheduled operations.

In order to best take advantage of these energy savings, built-in firmware in microcontroller 120 was programmed to wake up and automatically send turn-on signals to the sensors, sensing portions of the electronics, and the RF power supplies, 126, 130, 140, while synchronously performing analog to digital conversions of data received in A/D converter 124 and providing RF communications with transmitter 142.

In another embodiment of the power saving scheme, microprocessor 120 is programmed to wake up and automatically send turn-on signals to sensors connected to inputs 136a, 136b, 136c, power supply 130 for sensor signal conditioning 128, a/d converter, and non-volatile memory 122, but RF transmitter or transceiver power supply 140 is left off. In this embodiment data is transmitted out at a much lower rate than data is sampled and stored. Microprocessor 120 provides data it receives to nonvolatile memory 122 during the turn-on signal time for later transmission. Microprocessor goes back into sleep mode between samplings until time for the next turn-on signal arrives. This embodiment is similar to one herein above for the piezoelectric energy harvesting system, in which data was not transmitted in real time. Substantial energy savings are achieved by storing data in non-volatile memory 122 and then transmitted later, when charge in energy storage device 160 reaches a pre-determined level.

Figure 18:
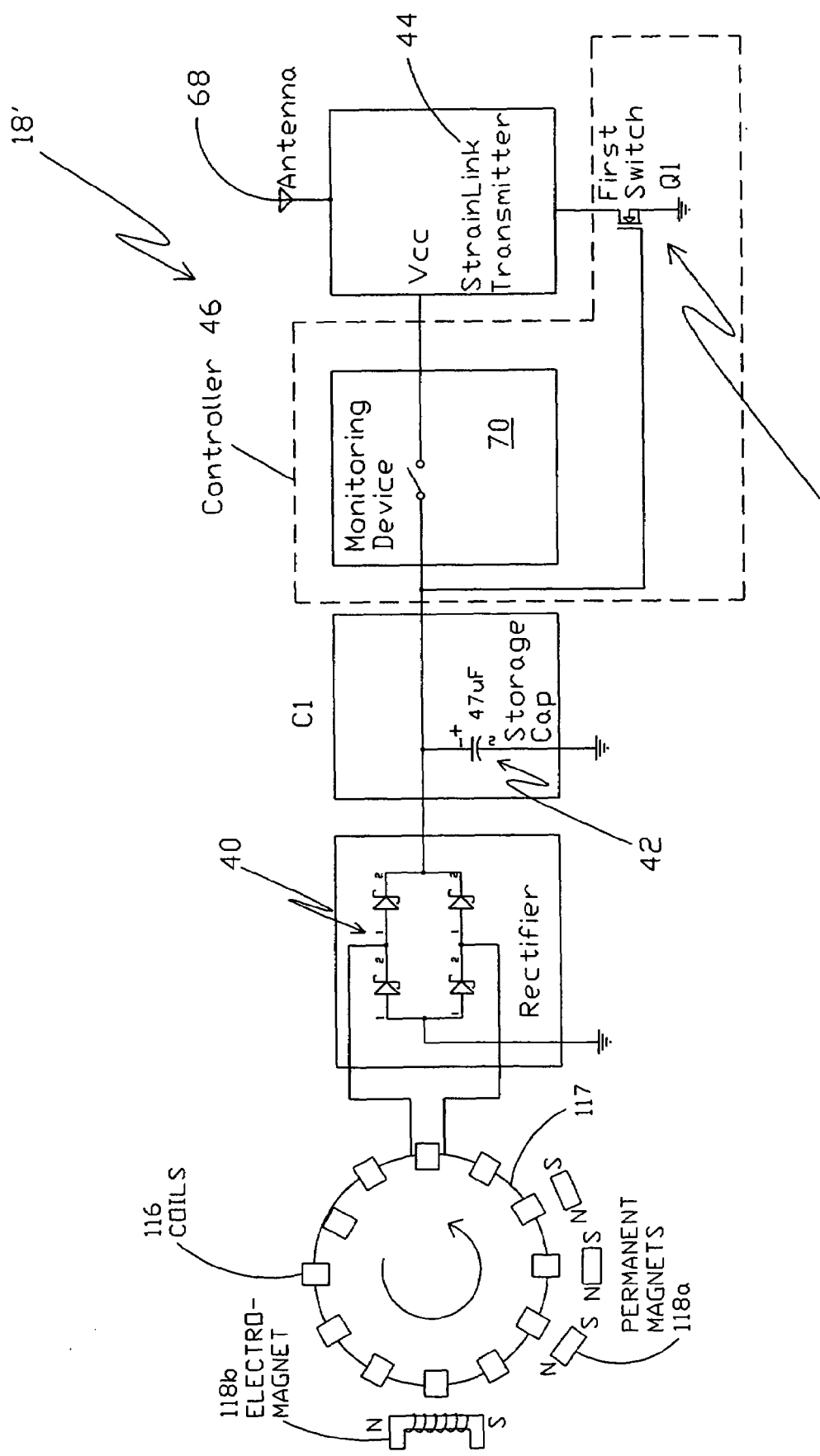
FIG. 18 is a block diagram of an embodiment of an energy harvesting addressable wireless sensing node of the present invention in which energy is harvested from a rotating shaft, rectified, stored in an energy storage device, and this energy is switched in to power a transmitter when charge on the energy storage device reaches a threshold.

A circuit similar to that used in the piezoelectric energy harvesting design described herein above and in FIG. 3a can be used to store energy and trigger transmission of data when sufficient energy has been stored in energy storage device 42, as shown in FIG. 18. Energy storage device 42 is preferably a low leakage capacitor, such as a 47 uF capacitor. A larger capacitor can be used but it may take longer to charge depending on the rotation speed of shaft 117, the number of coils 116, and the number of permanent magnets 118a. Alternatively energy storage device 42 could be a rechargeable battery.

With microprocessor 120 in sleep mode between turn-on signals, and other power using devices turned off between turn-on signals, the present invention provides for very efficient use of power harvested from potentially slowly spinning shaft 117.

To illustrate this point, we compared the power required for five distinct modes of operation: (1) data processing and RF transmission of processed data: 45 milliwatts; (2) processing/logging of sensed data without transmission: 5.0 milliwatts; (3) pulsed power at 10 Hz and transmitting at this 10 Hz rate but with microprocessor 120 in sleep mode and all other elements turned off between turn-on signals: 0.75 milliwatts; (4) pulsed power at 10 Hz and not transmitting but storing data in a non-volatile memory, and with microprocessor 120 in sleep mode and all other elements turned off between turn-on signals: 0.300 milliwatts; and (5) sleep mode and all other elements turned off: 0.02 milliwatts.

Furthermore, by collecting and storing data from strain sensor 154b in non-volatile memory 122 during one or more revolutions of shaft 117, and then analysing the data in microprocessor 120 so as to reduce the amount of data to be transmitted, and then transmitting only the result of the analysis with RF transmitter or transceiver 142, time for transmission may be reduced and power for transmitting may be further conserved, as compared with transmitting all the raw data streaming from sensors connected to inputs 136a, 136b, 136c. Such a scheme is described in the papers, "Wireless Strain Measurement Systems, Applications & Solutions," by Arms et al., *Proceedings of the Joint Meeting of the National Science Foundation and the European Science Foundation* for structural health monitoring, Strasbourg, France, October 2003, incorporated herein by reference and available from www.microstrain.com/white/wireless_strain_measurement_systems_revb_for_web.pdf and "Harvesting Strain Energy for Wireless Sensor Networks,"
by S. Arms and C. Townsend, *Proceedings of the First International Workshop on Advanced Smart Materials and Smart Structures Technology*, Honolulu, Hi., Jan. 12-14, 2004. By periodically transmitting information only after data analysis in microprocessor 120, such as the maximum, minimum, and average of the torque, RPM, and/or power from the shaft, significant power savings may be realized as compared with transmitting raw data.

If shaft 117 is spinning at a very low angular rate or low RPM, microprocessor 120 may need to wait until sufficient energy has been stored in energy storage device 160, as more fully described herein below, before sending turn-on signals for collecting and storing the data in non-volatile memory 122. Microprocessor 120 can assess the level of charge on energy storage device 160 by connecting energy storage device 160 to voltage divider 164 consisting of two high resistances. Voltage divider 164 reduces the voltage of energy storage device 160 to a voltage that microprocessor 120 can read directly with one of its on board 8 bit A/D converters 124 and also provides a load for more accurate assessment of the state of charge. From measuring this voltage at different times microprocessor 120 can also tell whether charge storage device 160 is charging or discharging. Voltage divider 164 is controlled by microprocessor 120 using switch 166 to avoid current draw when microprocessor 120 is not monitoring the state of charge of energy storage device 160.

By contrast, when shaft 117 is spinning at a high angular rate or high RPM, microprocessor 120 will preferably be programmed to provide a high rate of turn-on signals to sample the torsional strains on shaft 117 at a higher sampling rate and transmit data frequently. The present invention allows the system to adapt its sampling rates, sample duration, storage rate, and transmission rate depending on the amount of energy available from shaft 117 in the particular application, and to adapt to the changing operating conditions of spinning shaft 117, coils 116, and energy storage device 160.

For very slowly rotating shafts, Wiegand wires (not shown) may be deployed for energy generation, rather than coils 116. Wiegand wires have advantage in that their current pulse amplitude is independent of the rate of change of magnetic field strength. Conversely, coils 116 will produce prodigious energy at higher RPMs, but their ability to produce energy at low RPM is much less than they produce at higher RPM.

The present inventors demonstrated pulsed operation using a three channel, 1000 ohm/gauge, wireless strain gauge system. The system, if continuously powered, on average drew about 25 milliamps from a three volt regulated power supply. By pulsing energy to the electronics & communications link to provide measurements at a rate of 10 measurements each second for 50 to 100 useconds, the average current drawn was reduced by a factor of 100, down to about 250 microamps. This low power capability is enabling for long term battery operation, remote powering by external fields, and energy harvesting.

As shown in FIG. 19, if network of multiple wireless nodes 220 are deployed on a single shaft or on multiple shafts 221, 222, 223 or on multiple machines, pumps, etc. another strategy to save power is to remotely command each wireless sensing node 220a, 220b, 220c from base station 224. In one embodiment all components on all machines are kept in off state or in sleep mode until this command is received from base station 224. Alternatively, each node 220a, 220b, 220c can automatically collect data from its sensors and store its data in its own non-volatile memory

122*a*, 122*b*, 122*c* in that node but the data is only transmitted to base station 224 when a signal is received from base station 224 showing that base station 224 is nearby and ready to receive data.

Base station 224 can be mobile and located on a robot as described in patent application Ser. No. 10/379,224, incorporated herein by reference. Alternatively, a person can walk around with base station 224. Base station 224 can also be stationary.

If each shaft 221, 222, 223, pump, motor, or other machine is identified by a unique identification code associated with just that shaft then base station 224 can receive from the various nodes 220*a*, 220*b*, 220*c* on network 220 and identify data from each shaft 221, 222, 223 by its unique identification code.

Shafts 221, 222, 223 and wireless nodes 220*a*, 220*b*, 220*c* monitoring them can be located on mobile platforms. For example, shaft 221 can be the cam shaft or drive shaft, or another spinning part on a truck. Base station 224 can be on the truck too, but off the rotating shaft, and can use computer 226 to store and analyze data and cell phone 228 to call a home base to let the home base know that a particular shaft is operating outside its specifications and requires service.

In some industrial facilities hundreds of pumps or motors may be running simultaneously. The present invention provides a way to monitor all of them at once by harvesting energy from the spinning shaft of each pump or motor, monitoring the speed, torque, and power of each spinning shaft with apparatus on each spinning shaft, and transmitting the data from the shaft.

Alternatively, in some cases the energy conserving features described herein above may save so much energy as to eliminate the need for energy harvesting to recharge a battery. This may be the case if sampling at low frequency, such as 1 hz and if, as described herein above, the processor is in sleep mode and other electronics are turned off between samplings. In such a case some batteries may provide energy lasting several years without recharging, and in such a case energy harvesting for recharging can be avoided. Thus, the energy saving schemes provided herein may satisfy requirements in some cases without the need for energy harvesting from the spinning shaft.

A paper, "Civil Structure Strain Monitoring with Power-Efficient High-Speed Wireless Sensor Networks," by J. H. Galbreath J. H, C. P. Townsend, Mundell, S. W., Hamel M. J., Esser B., Huston, D., S. W. Arms, Proceedings of International Workshop for Structural Health Monitoring, September 2003, Stanford University, Palo Alto, Calif., incorporated herein by reference, describes addressable, wireless strain sensing nodes that respond to the following base station broadcast address and/or node specific address commands:

Wake up, listen for commands, log or send data as commanded (or back to sleep)

Wake up, log information when an event or threshold crossing is detected

Wake up, transmit data periodically, go back to sleep

These capabilities are included in the commercially available SG-Link and G-Link products mentioned herein above that embody the signal conditioning, processing, and turn-on signal capabilities described herein. However, those nodes do not have microprocessors that go back to sleep between turn-on signals to the other devices. They have on-board rechargeable batteries for power and do not have provision for energy provided from energy harvesting.

The addressable sensing nodes described in the paper feature 2 Mbytes of on-board, non-volatile memory for data storage, 2000 samples/second/channel logging rates, 1700 samples/sec/channel over-the-air data rates, bi-direction RF link with remote offset and gain programmability, compact enclosure, integral rechargeable Li-Ion battery, and on-board temperature sensor. Typical performance specifications for the wireless strain sensing node combined with conventional piezoelectric foil strain gauges (1000 ohm) are provided below:

Temperature coefficient offset 0.007%/deg C. (tested from +20 to +50 deg C.)

Temperature coefficient span 0.004%/deg C. (tested from +20 to +50 deg C.)

Operating temperatures −20 to +85 deg C.

Programmable full scale range: 1000 to 5000 microstrain

Resolution +/−2.5 microstrain (tested w/anti-aliasing filter bandwidth 0-500 Hz)

Figure 20:
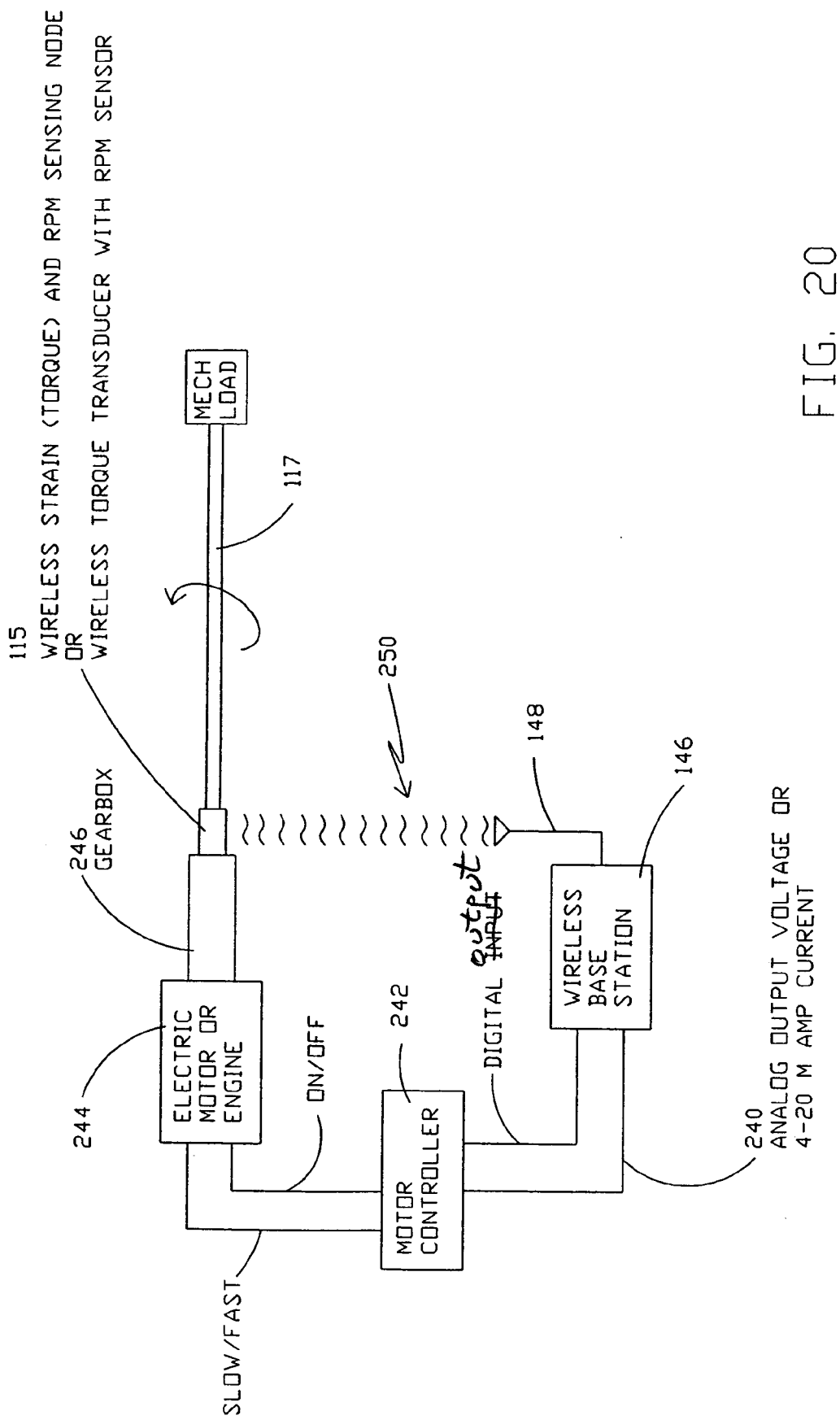
FIG. 20 is a block diagram of an embodiment showing feedback to a motor controller and the engine driving the shaft based on data transmitted from the shaft.

Preferably base station 146 has analog output 240 to provide feedback to motor controller 242 to adjust operation of electric motor or engine 244 which powers shaft 117 through gear box 246, as shown in FIG. 20. Feedback is based on the data received at base station 146 over wireless radio link 250 from the wireless torque and angular velocity sensing node 115 on shaft 117. Motor controller can either switch off electric motor or engine 244 or it can send a signal to change its speed. Analog output base stations are commercially available from Microstrain, Inc in Williston, Vt. They are called MicroTxRx Wireless Base Station with Analog Output, and further description of them is available from a manual available at http://www.microstrain.com/manuals/AnalogOutBasestationQuickStartGuideRevB.pdf incorporated herein by reference.

In one example, if data is received at base station 146 shows that shaft 117 is shaking violently, data about vibration sensed by an accelerometer mounted on shaft 117 can be fed back through transmitter 142 to analog output 240 of base station 146, and the machine driving shaft 117 can be turned off, or its speed reduced, to avoid damage to shaft 117 and down time for repairs.

In another example, presently motor current is frequently monitored to determine an end point to processing with a machine, such as polishing machine, by detecting a change in current, when polishing removes one layer of material and starts polishing a different material with a different hardness. However, motor current may vary widely during such a polishing operation. Also motor current is only an indirect indicator of torque in the shaft driving the polishing tool. The present invention allows a direct measurement of this torque, or another relevant mechanical property of the shaft, such as strain, and this data is transmitted from shaft 117 and received at base station 146 and provided as an analog output for use adjusting operation of motor 244 driving shaft 117. By directly measuring shaft mechanical properties and feeding back data to driving motor 244, greater accuracy in controlling torque in driving shaft 117 can be provided and such problems as overpolishing or metal fatigue in drive shaft 117 from over-driving can be prevented.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

The invention claimed is:

1. A device, comprising:
a rotatable shaft mounted for rotating around an axis;
an energy harvesting device having a first portion and a second portion, said first portion mounted to rotate with said rotatable shaft, said second portion mounted on fixed supports relative to said rotatable shaft so as to be non-rotatable around said axis when said rotatable shaft rotates around said axis, said energy harvesting device for converting motion of said first portion with respect to said second portion into electricity; and
a radio frequency communications device mounted to rotate with said rotatable shaft, said radio frequency communications device connected to be powered with electricity derived from said first portion, wherein all electricity for powering said radio frequency communications device is derived from said first portion.

2. A device as recited in claim 1, wherein said first position includes an inductor and wherein said second portion includes a magnet for providing a magnetic field arranged adjacent said rotatable shaft, wherein said inductor is capable of being magnetically coupled to said magnet during rotation of said rotatable shaft, wherein said energy harvesting device harvests energy from a pulse of electricity induced in said inductor by rotation of said inductor through said magnetic field.

3. A device as recited in claim 2, wherein said magnet comprises a permanent magnet.

4. A device as recited in claim 2, wherein said inductor comprises at least one from the group including a coil and a Weigand device.

5. A device as recited in claim 4, further comprising a plurality of said coils or said Weigand devices.

6. A device as recited in claim 1, wherein said rotatable shaft composes a measurable parameter, further comprising a sensor mounted to rotate with said rotatable shaft for measuring said measurable parameter, further wherein said radio frequency communications device comprises a transmitter, said transmitter for transmitting at least one from the group including said measurement and data derived from said measurement.

7. A device as recited in claim 6, wherein said sensor comprises at least one from the group including a temperature sensor, a strain gauge, a torque sensing device, a pressure sensor, and an accelerometer.

8. A device as recited in claim 7, wherein said strain gauge comprises resistance devices sensitive to strain.

9. A device as recited in claim 8, wherein said resistance devices are arranged in a chevron pattern.

10. A device as recited in claim 7, wherein said strain gauge is configured for measuring at least one from the group consisting of torque, bending, tension, and compression of said shaft.

11. A device as recited in claim 1, further comprising a rechargeable source of power mounted to rotate with said rotatable shaft, said rechargeable source of power connected for receiving and storing charge from said energy harvesting circuit.

12. A device as recited in claim 11, wherein said rechargeable source of power comprises at least one from the group including a battery and a capacitor.

13. A device as recited in claim 1, wherein a receiver is mounted to rotate with said rotatable shaft.

14. A device as recited in claim 13, wherein said receiver comprises a transceiver.

15. A device as recited in claim 1, further comprising a processor mounted to rotate with said rotatable shaft.

16. A device as recited in claim 15, further comprising a sensor and an A/D converter mounted to rotate with said rotatable shaft wherein said a/d converter is for converting sensor data to digital data.

17. A device as recited in claim 16, further comprising a memory device mounted to rotate with said rotatable shaft for storing said digital sensor data.

18. A device as recited in claim 17, wherein said memory device is integral with said processor.

19. A device as recited in claim 17, wherein said memory device contains a unique address to identify data transmitted from said memory device.

20. A device as recited in claim 16, wherein said processor contains a program to process said sensor data before transmitting.

21. A device as recited in claim 20, wherein said processor is configured to use said sensor data to calculate torque of said shaft and to calculate at least one from the group including angular velocity of said shaft and rate of rotation of said shaft.

22. A device as recited in claim 21, wherein said processor is configured to calculate power transmitted by said shaft by calculating the product of torque and rate of rotation.

23. A device as recited in claim 21, further comprising a data base of said torque calculations for comparing to a present calculation of torque for detecting a change in torque.

24. A device as recited in claim 20, wherein said processor is configured to use said sensor data to calculate torque of said shaft and wherein said processor is configured to calculate power transmitted by said shaft from said torque and from rate of rotation of said shaft as sensed by said rate of rotation detector.

25. A device as recited in claim 16, wherein said processor is configured to determine a change in a parameter related to at least one from the group including said shaft, a support for said shaft, a device powering said shaft, and a device powered by said shaft based on a change in said sensor data.

26. A device as recited in claim 16, wherein said processor is configured to determine a change in a parameter related to at least one from the group including said shalt, a support for said shaft, a device powering said shaft, and a device powered by said shaft based on a change in at least one from the group including torque and power of said shaft.

27. A device as recited in claim 16, further comprising a feedback mechanism to adjust operation of said shaft based on said sensor data.

28. A device as recited in claim 15, wherein said processor controls operation of said transmitter.

29. A device as recited in claim 1, wherein said shaft is part of a machine for delivering torque.

30. A device as recited in claim 29, wherein said machine includes at least one from the group including a motor, a vehicle, a pump, a valve, a compressor, a polishing machine, a grinder, a lathe, and a milling machine.

31. A device as recited in claim 30, wherein said vehicle includes an aircraft.

32. A device as recited in claim 1, further comprising a rate of rotation detector mounted to rotate with said rotatable shaft.

33. A device as recited in claim 32, wherein said energy harvesting device includes said rate of rotation detector.

34. A device as recited in claim 32, wherein said energy harvesting device includes a mechanism for counting electrical pulses.

35. A device, comprising:
a rotatable shaft;
an energy harvesting circuit mounted to rotate with said rotatable shaft, said energy harvesting circuit for convening mechanical energy of motion of said rotatable shaft into electricity;
a sensor including at least one from the group consisting of a strain gauge, a torque sensing device, and an accelerometer, said sensor mounted to rotate with said rotatable shaft; and
a radio frequency communications device mounted to rotate with said rotatable shaft, said radio frequency communications device connected to be powered with electricity derived from said energy harvesting circuit wherein all electricity for powering said radio frequency communications device is derived from said energy harvesting circuit.

36. A device as recited in claim 35, further comprising a controlling circuit mounted to rotate with said rotatable shaft for operating said radio frequency communications device, wherein said controlling circuit is connected to receive all its electricity derived from said energy harvesting device.

37. A device as recited in claim 36, wherein said controlling circuit includes a digital circuit.

38. A device as recited in claim 36, wherein said controlling circuit includes a processor.

39. A device as recited in claim 38, wherein said processor is connected for receiving data derived from said sensor.

40. A device as recited in claim 39, further comprising an A/D converter for rotating with said rotatable shaft, wherein said A/D converter is connected for converting sensor data to digital data.

41. A device as recited in claim 40, further comprising a memory device for rotating with said rotatable shaft, wherein said memory device is connected for storing said digital data.

42. A device as recited in claim 41, wherein said memory device is integral with or connected to said processor.

43. A device as recited in claim 41, wherein said memory device contains a unique address to identify data transmitted from said memory.

44. A device as recited in claim 39, wherein said processor contains a program to process said data before providing said data to said radio frequency communications device.

45. A device as recited in claim 39, wherein said processor is configured to calculate torque of said shaft and at least one from the group including angular velocity of said shaft and rate of rotation of said shaft.

46. A device as recited in claim 45, wherein said processor is configured to calculate power transmitted by said shaft by calculating the product of torque and rate of rotation.

47. A device as recited in claim 45, further comprising a data base of said torque calculations for comparing to a present calculation for detecting a change in torque.

48. A device as recited in claim 39, wherein said processor is configured to determine a change in a parameter related to at least one from the group including said shaft, a support for said shaft, a device powering said shaft, and a device powered by said shaft, based on said sensor measurement.

49. A device as recited in claim 39, wherein said processor is configured to determine a change in a parameter related to at least one from the group including said shaft, a support for said shaft, a device powering said shaft, and a device powered by said shaft based on a change in at least one from the group including torque and power of said shaft.

50. A device as recited in claim 39, further comprising a feedback mechanism capable of receiving said sensor data, said feedback mechanism capable of adjusting operation of said shaft based on said sensor data.

51. A device as recited in claim 39, wherein said processor is configured to use said sensor data to calculate torque of said shaft and wherein said processor is configured to calculate power transmitted by said shaft from said torque and from rate of rotation of said shaft as sensed by said rate of rotation detector.

52. A device as recited in claim 35, further comprising a memory device having an address.

53. A device as recited in claim 35, wherein said energy harvesting circuit includes an inductor.

54. A device as recited in claim 53, wherein said inductor comprises at least one from the group including a coil and a Weigand device.

55. A device as recited in claim 54, further comprising a plurality of said coils or said Weigand devices.

56. A device as recited in claim 53, further comprising a device for generating a magnetic field located adjacent said rotatable shaft.

57. A device as recited in claim 56, wherein said device for generating a magnetic field includes a permanent magnet.

58. A device as recited in claim 35, further comprising at least one from the group consisting of a temperature sensor, and a pressure sensor.

59. A device as recited in claim 35, wherein said strain gauge comprises resistance devices sensitive to strain.

60. A device as recited in claim 59, wherein said resistance devices are arranged in a chevron pattern.

61. A device as recited in claim 35, wherein said strain gauge is configured for measuring at least one from the group including torque, bending, tension, and compression of said shaft.

62. A device as recited in claim 35, further comprising a rechargeable source of power mounted to rotate with said rotatable shaft and connected for receiving and storing electricity derived from said energy harvesting circuit.

63. A device as recited in claim 62, wherein said rechargeable source of power includes at least one from the group including a battery and a capacitor.

64. A device as recited in claim 35, wherein said radio frequency communications device includes a transmitter.

65. A device as recited in claim 35, wherein said radio frequency communications device includes a transceiver.

66. A device as recited in claim 35, wherein said rotatable shaft is part of a machine for delivering torque.

67. A device as recited in claim 66, wherein said machine includes at least one from the group including a motor, a vehicle, a pump, a valve, a compressor, a polishing machine, a grinder, a lathe, and a milling machine.

68. A device as recited in claim 67, wherein said vehicle includes an aircraft.

69. A device as recited in claim 35, further comprising a rate of rotation detector mounted to rotate with said rotatable shaft.

70. A device as recited in claim 69, wherein said energy harvesting device includes said rate of rotation detector.

71. A device as recited in claim 70, wherein said energy harvesting device includes a mechanism for counting electrical pulses.

72. A device, comprising:
a rotatable shaft;
a power supply including a circuit and a rechargeable source of power, said circuit and said rechargeable source of power mounted to rotate with said rotatable shaft, said circuit for convening mechanical energy of motion of said rotatable shaft into electricity, said rechargeable source of power for receiving and storing electricity derived from said circuit;

a radio frequency communications device mounted to rotate with said rotatable shaft wherein all electricity for powering said radio frequency communications device is derived from at least one from the group consisting of said circuit and said rechargeable source of power; and a control circuit for disconnecting power to said radio frequency communications device when said power supply does not have sufficient electricity stored for operating said radio frequency communications device, said control circuit for reconnecting power to said radio frequency communications device when said power supply has sufficient electricity stored for operating said radio frequency communications device.

73. A device as recited in claim 72, wherein said rechargeable source of power includes at least one from the group including a battery and a capacitor.

74. A device as recited in claim 72, wherein said circuit includes a rate of rotation detector.

75. A device as recited in claim 74, further comprising a torque sensor and a processor, wherein said processor is configured to use torque sensor data to calculate torque of said shaft, and wherein said processor is configured to calculate power transmitted by said shaft from said torque and from rate of rotation of said shaft as sensed by said rate of rotation detector.

76. A device as recited in claim 72, further comprising a sensor and a data storage device, said data storage device for logging data, wherein said control circuit provides data derived from said storage device for transmission in said radio frequency communications device.

77. A device as recited in claim 76, wherein said data storage device is capable of logging data while power is disconnected from said radio frequency communications device.

78. A device as recited in claim 72, wherein said control circuit includes a monitoring device and a switch.

79. A device as recited in claim 72, wherein said rotatable shaft is part of a machine for delivering torque.

80. A device as recited in claim 79, wherein said machine includes at least one from the group including a motor, a vehicle, a pump, a valve, a compressor, a polishing machine, a grinder, a lathe, and a milling machine.

81. A device as recited in claim 80, wherein said vehicle includes an aircraft.

82. A device, comprising:
a rotatable shaft;
an energy harvesting circuit mounted to rotate with said rotatable shaft, said energy harvesting circuit for converting mechanical energy of motion of said rotatable shaft into electricity;
a sensor for providing sensor data mounted to rotate with said rotatable shaft,
a feedback mechanism capable of receiving said sensor data, said feedback mechanism capable of adjusting operation of said rotatable shaft based on said sensor data; and
a radio frequency communications device mounted to rotate with said rotatable shaft said radio frequency communications device connected to be powered with electricity derived from said energy harvesting circuit, wherein all electricity for powering said radio frequency communications device is derived from said energy harvesting circuit.

83. A device as recited in claim 82, wherein said energy harvesting circuit includes an inductor and a rechargeable source of power.

84. A device as recited in claim 82, further comprising a magnet for magnetically coupling to said inductor.

85. A device as recited in claim 84, wherein said rotatable shaft is mounted for rotating around an axis, wherein said magnet is mounted adjacent said rotatable shaft so as to be non-rotatable around said axis when said rotatable shaft rotates around said axis.

86. A device as recited in claim 82, further comprising a wireless base station.

87. A device as recited in claim 82, further comprising a motor, a motor controller, and a wireless base station, said motor connected for driving said shaft, said motor controller connected for controlling operation of said motor, wherein said feedback mechanism includes said wireless base station and said motor controller.

88. A device as recited in claim 82, further comprising a rate of rotation detector mounted to rotate with said rotatable shaft.

89. A device as recited in claim 88, wherein said energy harvesting device includes said rate of rotation detector.

90. A device as recited in claim 89, wherein said energy harvesting device includes a coil and a circuit for counting electrical pulses in said coil.

91. A device as recited in claim 88, further comprising a processor, wherein said processor is configured to use said sensor data to calculate torque of said shaft and wherein said processor is configured to calculate power transmitted by said shaft from said torque and from rate of rotation of said shaft.

92. A device as recited in claim 82, wherein said rotatable shaft is part of a machine for delivering torque.

93. A device as recited in claim 92, wherein said machine includes at least one from the group including a motor, a vehicle, a pump, a valve, a compressor, a polishing machine, a grinder, a lathe, and a milling machine.

94. A device as recited in claim 93, wherein said vehicle includes an aircraft.

95. A device, comprising:
a rotatable object;
an energy harvesting device and an energy consuming device, said energy harvesting device having a circuit mounted to rotate with said rotatable object, said energy consuming device mounted to rotate with said rotatable object, said circuit converting mechanical energy of motion of said rotatable object into electricity available for use in said energy consuming device; and
a rate of rotation detector mounted to rotate with said rotatable object and provide information about rate of rotation of said rotatable object.

96. A device as recited in claim 95, wherein said rate of rotation detector is integrated with said energy harvesting circuit.

97. A device as recited in claim 95, wherein said energy consuming device includes a radio frequency communications device.

98. A device as recited in claim 97, wherein all electricity for powering said radio frequency communications device is derived from said energy harvesting circuit.

99. A device as recited in claim 97, wherein said radio frequency communications device is connected to transmit data derived from said information about rate of rotation of said rotatable object.

100. A device as recited in claim 95, wherein said rotatable shaft is part of a machine for delivering torque.

101. A device as recited in claim 100, wherein said machine includes at least one from the group including a motor, a vehicle, a pump, a valve, a compressor, a polishing machine, a grinder, a lathe, and a milling machine.

102. A device as recited in claim 101, wherein said vehicle includes an aircraft.

103. A device, comprising:
a rotatable shaft;
an energy harvesting device includes a first portion and a second portion, said first portion mounted to rotate with said, rotatable shaft, said second portion mounted on fixed supports relative to said rotatable shaft, said energy harvesting device for converting mechanical energy of motion of said rotatable shaft into electricity;
a radio frequency communications device mounted to rotate with said rotatable shaft, said radio frequency communications device connected to be powered with electricity derived from said first portion, wherein all electricity for powering said radio frequency communications device is derived from said first portion.

104. A device as recited in claim 103, wherein said first portion includes an inductor and wherein said second portion includes a magnet arranged adjacent said rotatable shaft, said magnet for providing a magnetic field wherein said inductor is capable of being magnetically coupled to said magnet during rotation of said rotatable shaft, wherein said energy harvesting device harvests energy from a pulse of electricity induced in said inductor by rotation of said inductor through said magnetic field.

105. A device as recited in claim 104, wherein said first portion includes a plurality of said inductors.

106. A device as recited in claim 103, further comprising a sensor mounted to rotate with said rotatable shaft, wherein said sensor comprises at least one from the group including a temperature sensor, a strain gauge, a torque sensing device, a pressure sensor, and an accelerometer.

107. A device as recited in claim 106, wherein said strain gauge is configured for measuring at least one from the group consisting of torque, bending, tension, and compression of said shaft.

108. A device as recited in claim 103, further comprising a rechargeable source of power mounted to rotate with said rotatable shaft, said rechargeable source of power connected for receiving and storing charge from said energy harvesting device.

109. A device as recited in claim 103, further comprising a processor mounted to rotate with said rotatable shaft.

110. A device as recited in claim 109, wherein said processor is configured to calculate power transmitted by said shaft by calculating the product of torque and rate of rotation.

* * * * *